(12) United States Patent  
Stumpf

(10) Patent No.: US 6,260,331 B1
(45) Date of Patent: Jul. 17, 2001

(54) METHOD AND APPARATUS FOR THE MANUFACTURE OF POCKETED SPRINGS

(75) Inventor: Walter Stumpf, Dunwoody, GA (US)

(73) Assignee: Sidhil Technology, LLC, Norcross, GA (US)

( * ) Notice: Subject to any disclaimer, the term of this patent is extended or adjusted under 35 U.S.C. 154(b) by 0 days.

(21) Appl. No.: 09/501,745

(22) Filed: Feb. 10, 2000

Related U.S. Application Data

(63) Continuation-in-part of application No. 09/334,910, filed on Jun. 17, 1999.

(51) Int. Cl.[7] ............................................. B65B 13/20
(52) U.S. Cl. ............................. 53/436; 53/438; 53/450; 53/428; 53/114
(58) Field of Search ............................. 53/436, 114, 438, 53/439, 450, 459, 428, 429, 550, 526, 568, 570; 156/70, 291; 29/91, 771

(56) References Cited

U.S. PATENT DOCUMENTS

| | | |
|---|---|---|
| 1,218,314 | 3/1917 | Read . |
| 1,370,533 | 3/1921 | Genge . |
| 1,445,416 | 2/1923 | Shields . |
| 1,685,566 | 9/1928 | Gail . |
| 1,733,660 | 10/1929 | Gail . |
| 1,759,050 | 5/1930 | Gail . |
| 1,774,545 | 9/1930 | Chapman . |
| 1,813,993 | 7/1931 | Gail . |
| 2,093,531 | 9/1937 | Werner . |
| 2,430,098 | 11/1947 | Binch . |
| 2,983,236 | 5/1961 | Thompson . |
| 3,668,816 | 6/1972 | Thompson . |
| 4,439,977 | 4/1984 | Stumpf . |
| 4,854,023 | 8/1989 | Stumpf . |
| 5,438,718 | 8/1995 | Kelly et al. . |
| 5,553,443 | * 9/1996 | Clair et al. .............................. 53/450 |
| 5,613,287 | 3/1997 | St. Clair . |
| 6,021,627 | * 2/2000 | Mossbeck et al. ...................... 53/438 |
| 6,101,697 | * 8/2000 | Stumpf et al. .......................... 53/114 |

* cited by examiner

Primary Examiner—Peter Vo
Assistant Examiner—Sam Tawfik
(74) Attorney, Agent, or Firm—Fitch, Even, Tabin & Flannery

(57) ABSTRACT

This method and apparatus contemplate the making of pocketed springs for mattresses and cushions by inserting compressed springs at intervals along and between the plies of a folder two-ply strip of sheeting, maintaining the springs compressed therein while seaming the edges of the plies to form a sleeve about the compressed springs as the strip is drawn lengthwise toward a release point at which each spring is free to expand to spread the plies. This transposes the edge seaming to mid-height of the spring. A previously made cross seam incorporating the transposed edge seaming limits the forward movement of the spring and a further such cross seam made behind the spring encloses the spring within an individual pocket of the sleeve. The repetition of spring release and cross seaming behind each spring released produces a string or chain of pocketed springs with the closing seam of the sleeve at mid-height of the springs.

44 Claims, 17 Drawing Sheets

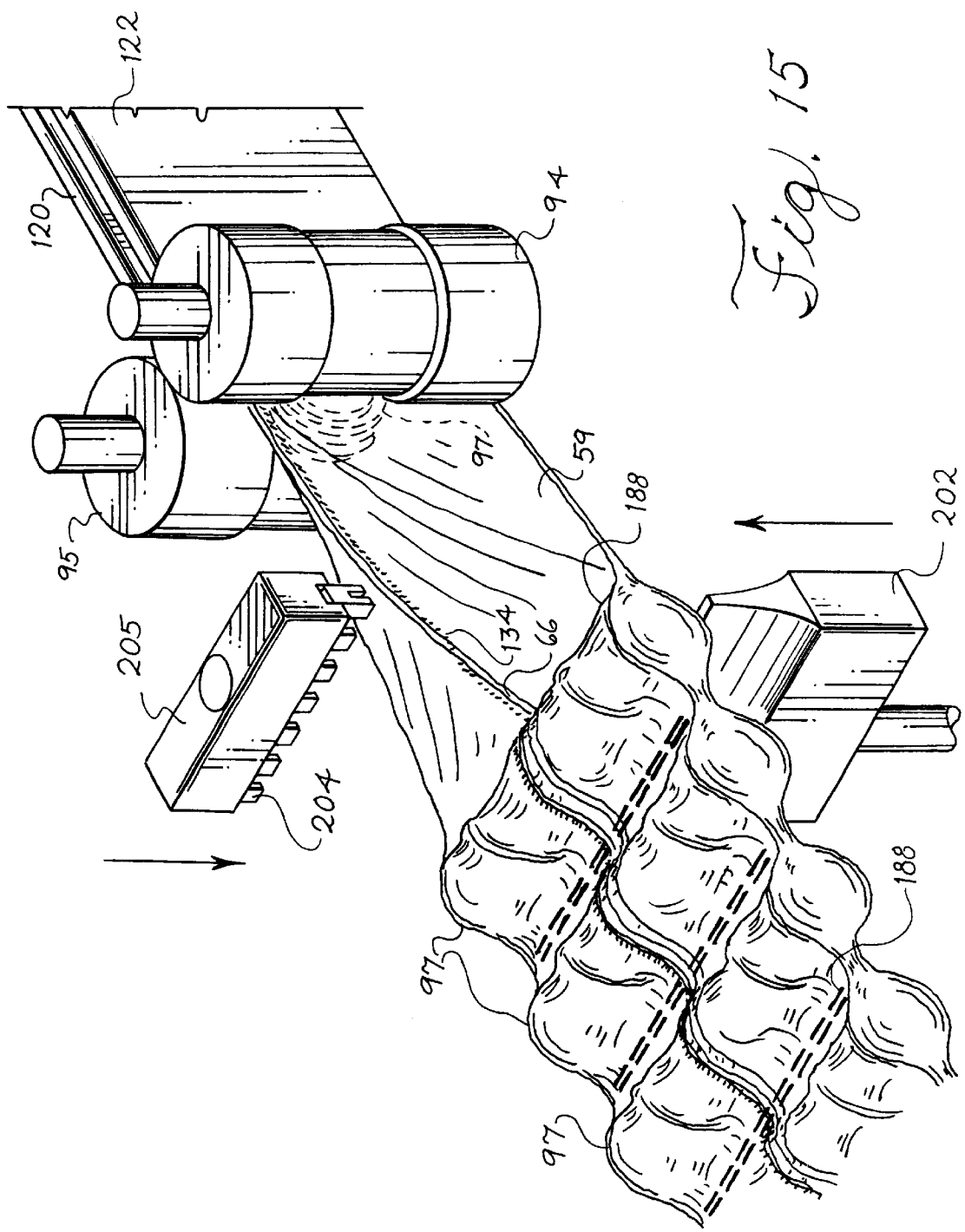

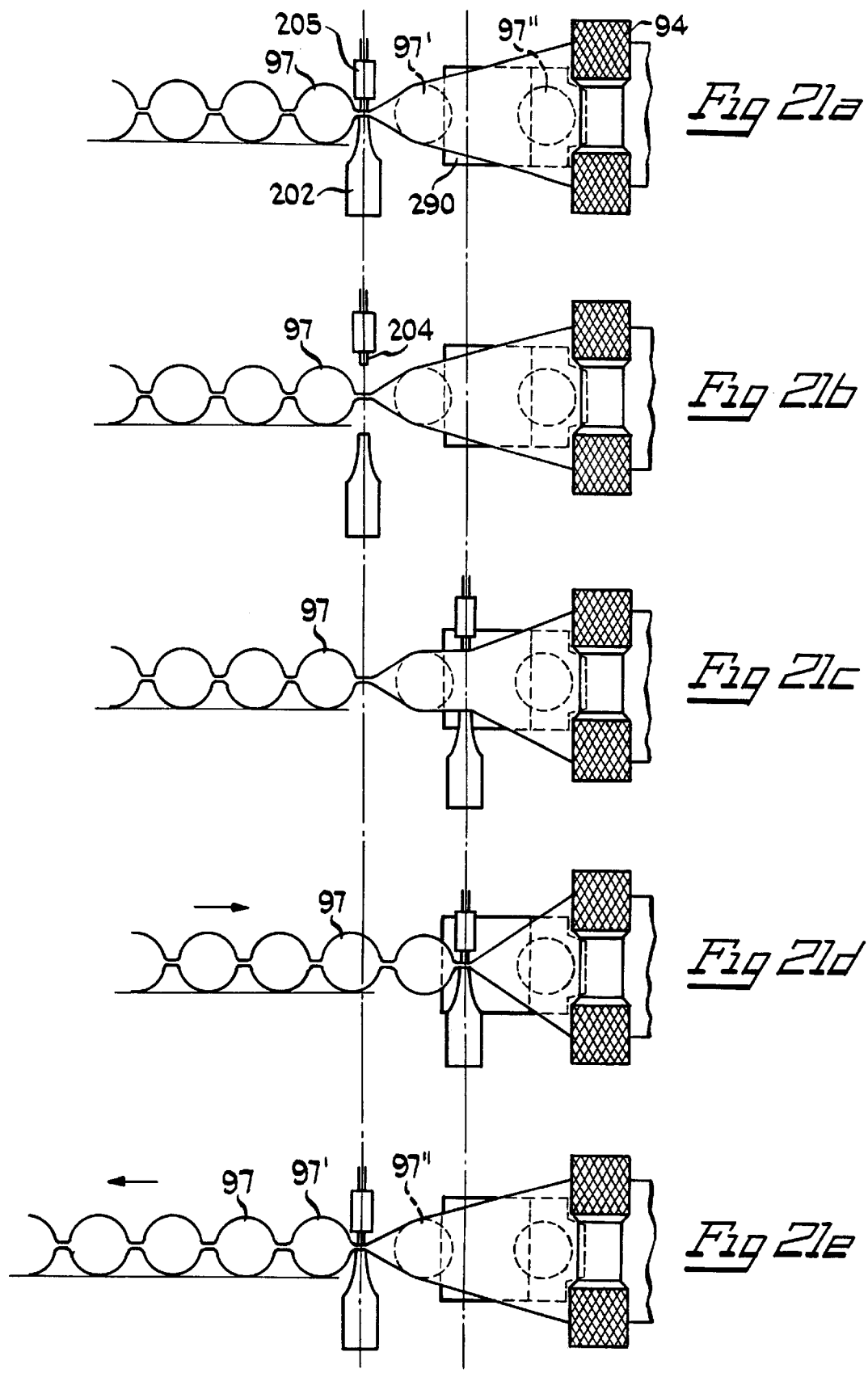

METHOD AND APPARATUS FOR THE MANUFACTURE OF POCKETED SPRINGS

CROSS REFERENCE TO RELATED APPLICATION

This application is a continuation-in-part of application Ser. No. 09/334,910, filed in the United States Patent and Trademark Office on Jun. 17, 1999.

BACKGROUND OF THE INVENTION

1. Field of the Invention

The invention relates to the manufacture of pocketed springs for mattresses, and for cushions for upholstered furniture.

2. Background and Description of Related Art

Pocketed springs are typically produced in strips of springs individually encased in pockets formed by seaming a strip of textile fabric folded upon itself longitudinally. Strips of such springs are then assembled side-by-side with the axes of the springs parallel, and joined by various techniques to produce a pocketed spring core for a mattress or cushion.

Such assemblies, long known to the trade, are referred to as Marshall units or "constructions", after the man thought to have originated the pocketed spring. See U.S. Pat. No. 685,160 of 1901. The best known example in the U.S. and Canadian markets of mattresses employing pocketed spring constructions is the Beautyrest mattress of Simmons Company, which was responsible also for much of the development of machinery for the automated production of pocketed springs. Significant representative patents are those of Simmons' early machine designer, John F. Gail, e.g., U.S. Pat. Nos. 1,685,566, 1,733,660, and 1,813,993.

The pocket fabric then used was woven cotton sheeting, in which the longitudinal and transverse seams which defined the pockets were lines of stitching performed by sewing machines. As ultimately developed, the compressed springs were inserted seriatim between the plies of the folded strip and maintained in the compressed condition by appropriate external constraint upon the moving strip. Sewing machines then sewed across the strip between the compressed springs to define the individual pockets about the springs, and longitudinally at the overlapped edges of the strip to close the pockets and confine the springs therein when the external restraint was subsequently released.

Upon the release of restraint, each spring expanded in the position in which it was inserted, i.e., with its ends pressing against the side walls of the pocket. Unstable in this position, the occasional spring would right itself in its pocket, but most would not, until manipulated externally to turn the spring in the pocket, allowing it to expand to the maximum height, transversely of the strip, permitted by the restraining pocket.

The further developments of the Gail technique in more recent times have been those related to the introduction of non-woven fabrics of thermoplastic fiber, and the substitution of thermal welding of such fabrics for sewing, as in U.S. Pat. No. 4,439,977. Those changes, in turn, and others as well, have ushered in a very substantial reduction in size and complication of the pocketed-spring-making apparatus, thereby removing a great deal of cost of the apparatus while improving its reliability and rate of production.

Basically, however, the Gail process, as described, has, until the present invention, undergone only minor change. The compressed spring is inserted between the sheets, a pocket is defined around it, the compression of the spring is released, and the spring is manipulated within the pocket to enable it to reach its maximum extension permitted by the pocket, i.e., with the spring axis oriented transversely of the strip.

This process, proven by time and used throughout the industrial world, is, however, not without its limitations. For example, it is difficult to adjust the apparatus to vary the spacing of the cross seams of the strip to accommodate springs of different diameter, or to alter the frictional grip of the pocket material upon the spring for its effect in varying the spring constant of the combination. Moreover, when making pocketed springs of reduced height relative to spring diameter, as for seat cushions, for example, it is often difficult to turn the spring within the completed pocket to align the spring axis transversely of the strip.

The departure of the improved and simplified method of this invention from the traditional method, and the apparatus herein disclosed for carrying out the improved method of the invention, not only overcome the stated limitations of the traditional method, they also result in a basic change in the pocketed springs from those produced by the traditional method, a change of product which the trade hailed as improvement but never accomplished satisfactorily on a production basis.

SUMMARY OF THE INVENTION

In the method of the present invention, the two fabric layers of which the pockets are made are first seamed longitudinally to form a sleeve after the compressed springs are inserted between the layers, and while the springs are constrained in the compressed condition. The pocket for each spring is not formed, however, until after the constraint is removed by the advance of the fabric strip through the apparatus, and the spring has expanded to the extent permitted by the confining sleeve. The spring is not turned within the sleeve, as in prior practice; rather, as it advances in the expanded condition within the advancing sleeve, a cross seam is made behind the expanded spring, parallel to the spring axis, to enclose it in a pocket behind the cross seam closure of the sleeve previously made, the sleeve being thereby flattened perpendicularly to the plane of the merely folded strip advancing into the apparatus.

This re-orientation of the sleeve effects a 90° rotation of the sleeve relative to the apparatus, and moves the longitudinal closing seam to the middle of the cross seam, which, when made, incorporates the closing seam and its excess material, and opens the interior of the sleeve into a tetrahedral tent extending rearwardly (relative to machine direction) from the cross seam to the point at which the sleeve and compressed spring therein emerge from the indexing rolls.

Such a cross seam is initially formed under manual control at start-up, and recurs automatically thereafter as a pocket is completed about each new spring.

Upon its rolling release from restraint of the index rolls, the expanding spring bounds forward within the tent, toward the previous cross seam. Thus, when the next cross seam is made behind the expanded spring to complete the pocket, the closing seam of the fabric sleeve is again incorporated into the cross seam, and secured at mid-height of the encased spring.

The cross-seaming mechanism is adjustable longitudinally of the path of the fabric strip through the apparatus in order to accommodate the making of pocketed springs of different diameter, or to adjust the tension of the fabric enclosing the spring, if desired for control of the resistance of the spring to compression.

DESCRIPTION OF THE DRAWINGS

The method and apparatus of the invention are hereinafter described in detail in reference to the accompanying drawings, which show the presently preferred embodiment of the apparatus. In the drawings.

FIG. 15 is an isometric view of the strip of springs after completion of a cross-seal, and with the next compressed spring about to bound forwardly into the tented fabric;

FIGS. 16a, 16b, 16c, and 16d are a sequence diagram of the formation of the spring pocket about the expanded spring;

FIGS. 21a, 21b, 21c, 21d, and 21e are a sequence of diagrams similar in nature to FIG. 16, but explaining rather the cyclical operation of the modification of FIGS. 19 and 20.

DESCRIPTION OF PREFERRED EMBODIMENT

The method of the invention is carried out by apparatus incorporating a series of coordinated operations in a sequence determined essentially by a master program control which calls the several apparatus functions into operation in predetermined order in overlapping repetitive cycles to produce pocketed springs.

As the apparatus overall may seem complicated, it is most conveniently examined in operating sections which in and of themselves are relatively uncomplicated, some being previously known, although with novel aspects developed in part for the sake of the novel method of the invention.

Notwithstanding the use of known instrumentalities, the sequence of their operations has been basically altered, which has permitted the elimination of one operation heretofore closely identified with pocketed spring manufacture, namely, the coil turner previously necessary to turn the compressed coil within the closed pocket after the pocket was formed. In the novel arrangement of the present invention, the need for coil turning is eliminated by forming the pocket only after the compressed spring has been allowed to expand in the same axial orientation it occupied as it traveled compressed through the apparatus, including its travel through the nip of the indexing drive rolls which draw the two-ply fabric through the apparatus.

This change results in manifold benefits. The elimination of the coil turning mechanism saves wear and tear on the spring pockets, and, in the case of flail-type turning mechanisms, eliminates the principal source of airborne dust and lint, a cause of discomfort to the operators and a constant maintenance problem. The elimination of the need for turning coils in their pockets renders the apparatus capable, without significant down time, of making pocketed springs of various heights and diameters, and perhaps more importantly, improves the pocketed spring product itself by moving the closing seam from the end of the pocketed spring to a point midway between the ends of the spring. So placed, it eliminates the one-sided "feel" of mattresses or cushions made with conventional pocketed springs, i.e., those with the closing seams of the pockets on the same face of the pocketed spring assembly, or "construction", in the language of the trade.

Figure 1:
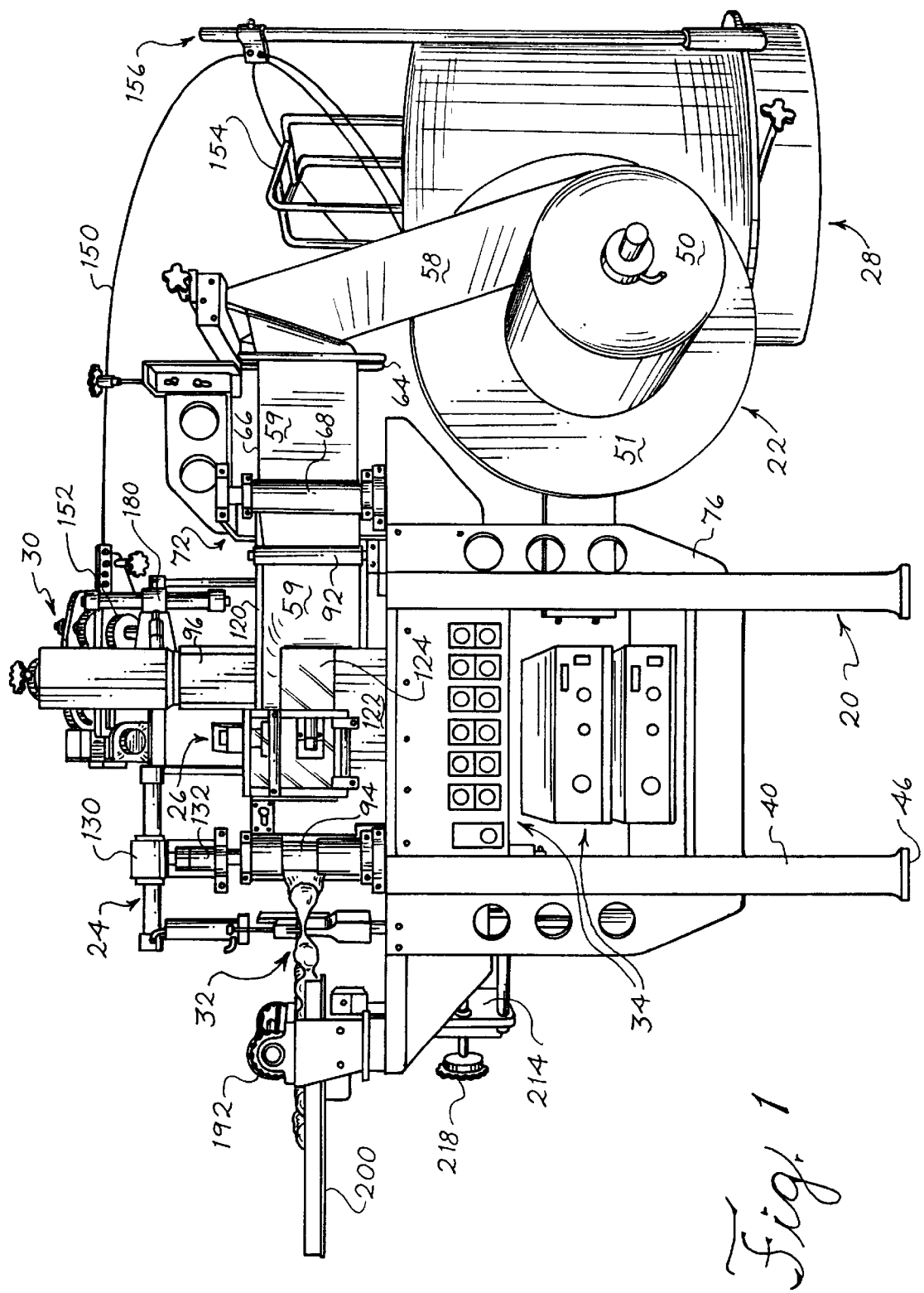
FIG. 1 is a front elevational perspective view of the apparatus of the invention;.

The principal sections of the apparatus, mostly supported in common upon a base 20, are, referring to FIG. 1 for orientation, the fabric supply and delivery section 22, adjustable for the handling of fabric strips of different widths to encase springs of different heights; the fabric indexing drive 24 and closing seam mechanism 26; wire supply 28, and the spring-forming, compressing and inserting section 30; the pocket-forming cross seam mechanism 32 which defines the pocket about the expanded spring; and the control mechanism 34 and its circuitry for calling the several operating sections into operation at the appropriate time.

The Supporting Structure

To present the principal operating parts of the apparatus at a height convenient to its human attendants, those elements are carried on the table-like support 20, rectangular in plan and fabricated in large part from standard structural shapes by welding.

The support 20 comprises an underframe of four angle iron legs 40 which are cross-connected near their tops and below mid-height by horizontal rails 42 and 44 of rectangular tube stock, and stand upon integral bolting pads 46 through which to secure the apparatus to the floor. The upper rails 42 support a heavy aluminum alloy bed plate 48 upon which many of the operating elements are directly mounted while others are supported by sideward extensions of the underframe described in detail in connection with those respective operating elements.

Fabric Supply and Delivery

The raw materials for making pocketed springs are the pocket fabric, and, in the case of wire springs, the spring wire from which the spring coils are formed.

Figure 2:
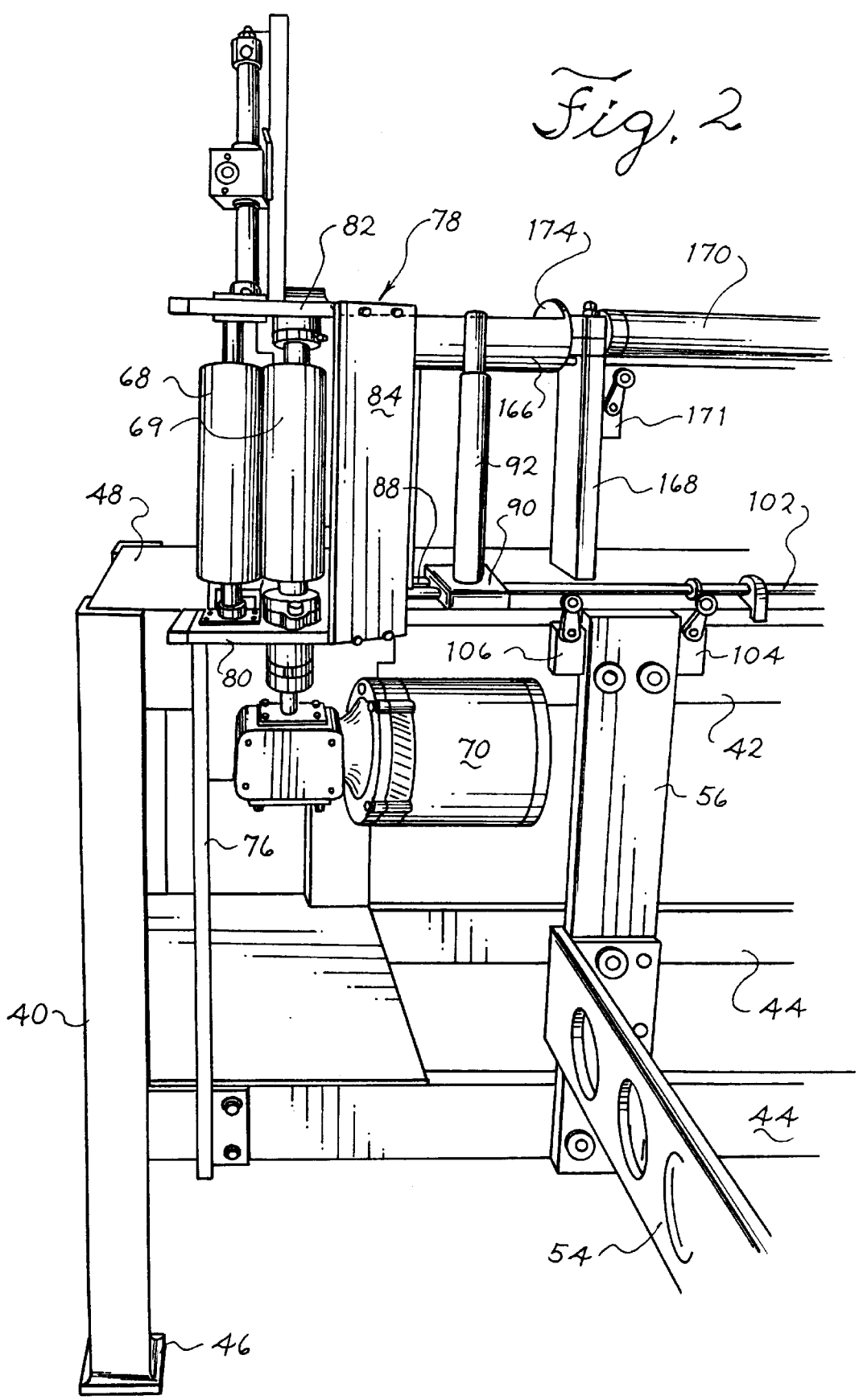
FIG. 2 is a partial elevational perspective view of the apparatus from the material feed side, showing the motor drive, and material feed details.

Referring to FIGS. 1 and 2, the pocket fabric is supplied in the form of a reel 50 of single ply fabric mounted against a guide plate 51 on a forwardly extending rotatable shaft 52 journalled near the end of an outrigger beam 54 cantilevered from a vertical rail member 56 secured at its ends to the upper and lower horizontal rails 42 and 44 of the underframe.

Figure 3:
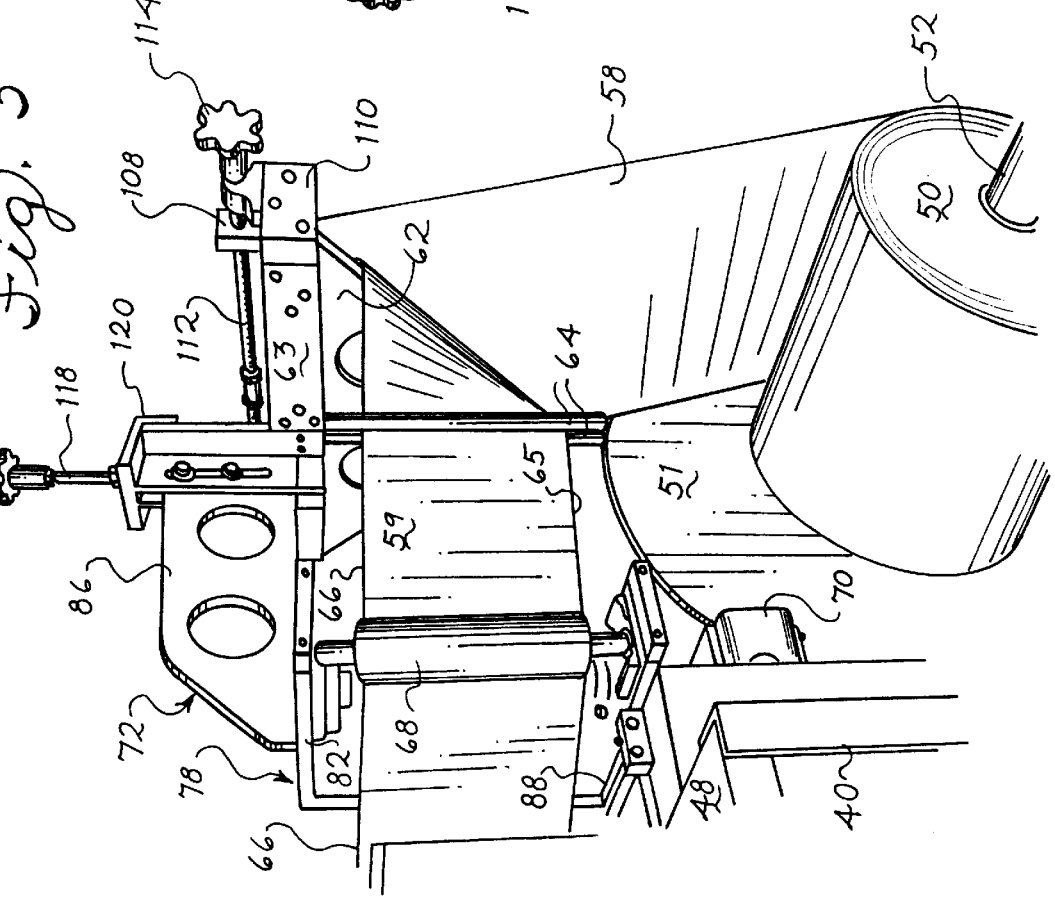
FIG. 3 is a perspective view of the material supply, folding, and feeding portions of the apparatus.
Figure 5:
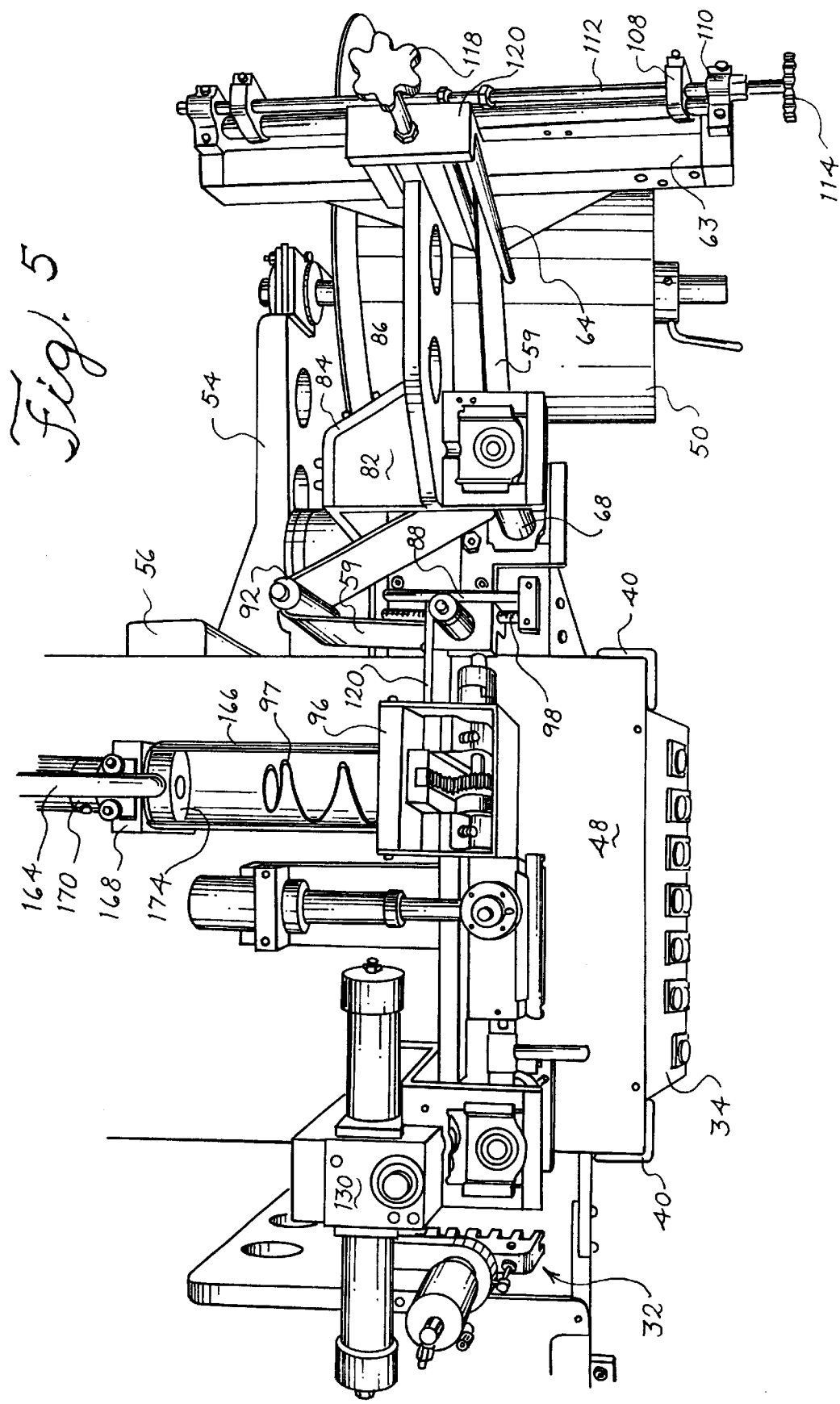
FIG. 5 is a top perspective view of the apparatus from the material input side toward the delivery side.

The fabric strip 58 is drawn from the supply reel 50 upwardly to and around a horizontal guide roll 60 (FIGS. 3 and 4), and then downwardly about a V-shaped folding plate 62 which doubles the strip lengthwise by delivery across its back face to and through a vertical slit between two parallel guide rods 64 secured at their upper ends in a bar 63 bolted to the back face of the folding plate 62. Emerging from between the parallel rods 64, the strip 58 has become the folded, two-ply strip 59 with its longitudinal fold 65 at the bottom, and the raw edges 66 of its plies uppermost, enters the nip of a pair of feed rolls 68, 69 driven by a constant speed, gear head motor 70 to draw the fabric strip 58 from the reel and through the folder.

Inasmuch as one of the benefits of the apparatus of the invention is its ability to make pocketed springs of different heights for different applications, the fabric supply and folding mechanisms are made adjustable to accommodate pocket material strip 58 of different widths. That is to say that, whatever the height of the springs to be pocketed, the raw edges 66 of the folded, two-ply strip 59 must be presented at the same elevation in the mechanism to implant the compressed coils between the plies, and to seam or seal the raw edges together to form a sleeve. This requirement in turn requires adjustable elevation of the longitudinal fold 65 of the two-ply strip 59, which in turn requires adjustable elevation of the V-shaped folding plate 62 and slit-forming rods 64. In addition, the supply reel and the single-ply fabric strip issuing therefrom must remain centered on the vertex of the folding plate 62 to maintain reasonable equality of width in the two plies of the folded fabric.

The feed rolls 68–69 and the strip-folding mechanism 60–64 are mounted upon a two-part bracket extension 72 of the bed plate 48 above and forwardly of the supply reel support beam 54.

The base portion 74 of the bracket is a downwardly open, U-shaped bent plate bolted at bed-plate level to the upper rail 42 of the underframe and to a wing-like vertical plate member 76 bolted to the underframe.

The bracket proper 78 (FIG. 2) comprises a base plate 80 and a parallel upper plate 82 connected by two vertical plate members 84 angled with respect to each other to rigidify the upper plate 82, which in turn supports a cantilevered outrigger beam 86 to support the adjustable-height folding mechanism 60–64.

The vertically-oriented feed rolls 68–69 are journalled in bearings in the base plate 80 and upper plate 82, respectively, the driven roll 69 in fixed alignment with the output shaft of the gear head motor 70 to which it is coupled (FIG. 2). The motor, in turn, is bolted to the U-shaped plate 74 which supports the base plate 80 of the feed-roll bracket 78. The mating feed roll 68 is journalled in slidably mounted bearings which are spring loaded to urge the feed rolls 68–69 into nip contact.

Mounted on the bracket base 74 alongside the feed rolls 68–69 is a slide track 88 for the front-to-rear sliding movement of the bearing block 90 of an upstanding tension roll 92 which maintains the folded fabric strip in tension from the feed rolls to a pair of indexing rolls 94–95 at the left side of the machine, which draw the folded fabric strip forward past the spring inserter 96 and the longitudinal closing seam mechanism 26.

The tension roll 92 moves toward and away from a line between the feed rolls 68–69 to the spring inserter 96 and is spring loaded to take up the slack in the folded fabric strip 59 delivered at a steady rate by the feed rolls 68–69 when the intermittently-driven index rolls 94–95 are idle. A simple compression coil spring 98 surrounding one of the guide rods 100 of the tension-roll bearing block 90 serves that purpose.

The tension roll 92 is also used to monitor the fabric supply. If the roll 92 moves a predetermined distance away from the line between the feed rolls and the indexing rolls to a limit position, a rod 102 extending rearwardly from the bearing block 90 engages a first limit switch 104 to stop the feed-roll drive motor 70. Similarly, if the feed rolls 68–69 are unable to deliver, for whatever reason, the resulting movement of the tension roll to its opposite limit against the force of the spring 98 will cause the rod 102 to operate a second limit switch 106 to interrupt power to the apparatus.

Adjustability of Folding Mechanism

As noted earlier, the folding mechanism 60–64 is adjustable in height to locate a two-ply fabric strip of any machine-usable width at a level which will present its raw edges 66 at the proper height relative to the spring-inserter 96 and the closing seam sealer 26. For this purpose, the entire folding mechanism, i.e., the guide roll 60, its strip centering guides 108, the folding plate 62 and its slit-forming guide rods 64, are movable up or down as a unit.

Figure 4:
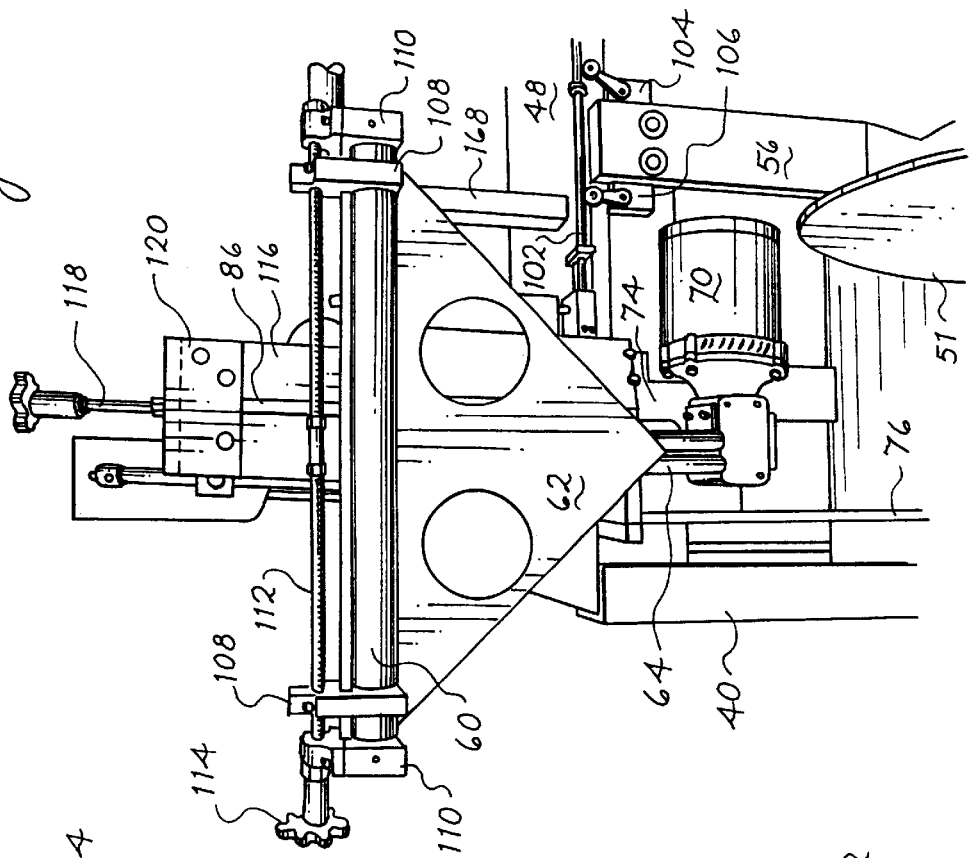
FIG. 4 is a further partial elevational perspective view of the apparatus from the material feed side showing the adjustable-width material folding device.

The rectangular support bar 63 secured to the upper edge of the folding plate 62 on its back side receives the upper ends of the vertical slit-forming bars 64, while pillow blocks 110 attached to the ends of the bar 63 reach across to the front of the folding plate 62 to journal the horizontal guide roll 60 and also to journal a left-hand and right-hand threaded shaft 112 (FIG. 4). The threaded shaft 112 engages fabric edge guides 108 centered on the vertex of the folding plate 62, to render the edge guides adjustable in unison toward and away from center when the threaded shaft 112 is turned by the handwheel 114 on the end of the shaft nearer the front of the machine.

Secured to the back side of the support bar 63 is a pair of vertical angle brackets 116 which flank the distal end of the cantilevered outrigger beam 86. Elongated vertical slots in the brackets 116 receive bolts passed through the cantilevered beam 86 to guide the vertical movement of the folding mechanism and to lock the same at any desired elevation. A hand screw 118 threaded in an angle cap 120 secured to the vertical angle brackets 116, bears against the upper edge of the cantilevered beam 86 to raise or lower the assembly relative to the beam, and thus to the apparatus as a whole.

The supply reel 50, whatever its width, is centered on its support shaft by adjustment thereon of the guide plate 51, movable along the shaft and secured thereto by releasable clamps to accommodate rolls of strip of different width.

The Fabric Drive and Closing Seam Mechanism

Figure 6:
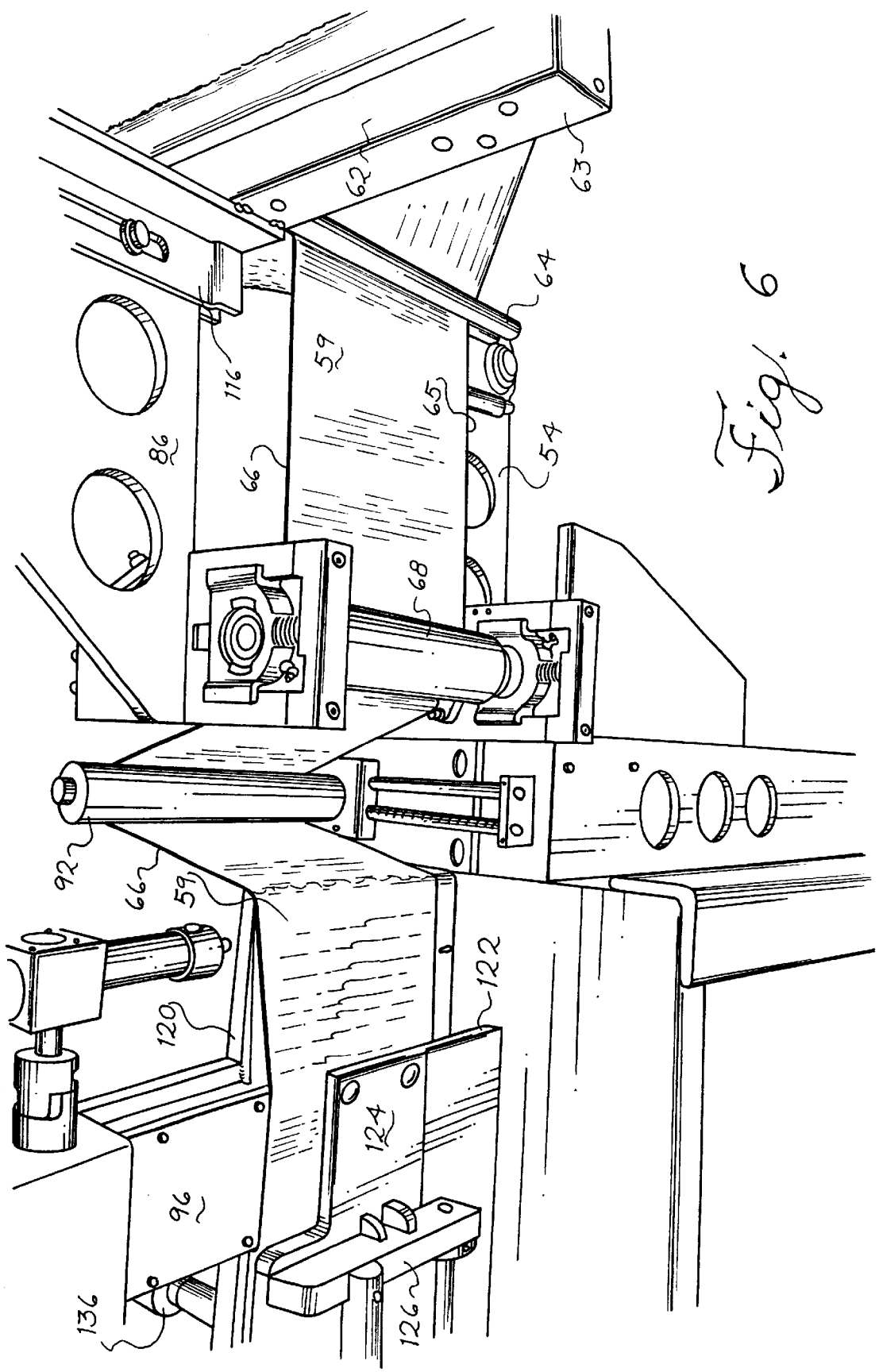
FIG. 6 is an upper front perspective view of the material feed side of the apparatus, showing the folded strip material in relation to the feed rolls, the tension roll, and the spring inserter.

The two-ply fabric strip 59, moving from right to left in FIG. 1, leaves the tension roll 92 and abruptly changes direction to enter the constricted space between two upright parallel plates 120 and 122 (FIGS. 9 and 10), of which the forward plate 122 includes a sturdy access door 124 of transparent plastic plate, such as General Electric Company's Lexan, mounted on a sturdy frame 126 of metal bars hinged on a horizontal axis at its lower edge, and normally maintained in its closed position (FIG. 9) by a bolt latch 128. Between the plates, extending downwardly between the plies of the folded fabric strip 59, is the delivery end of the spring inserter 96 (FIG. 6).

At the downstream end of the two plates 120 and 122, the folded fabric strip 59, carrying compressed springs 97 between its plies, enters the nip of the indexing drive rolls 94 and 95, which are surfaced with rubber to grip the two-ply fabric strip 59 securely between them. The roll surfaces are necked-down to a lesser diameter between their ends to accept and readily pass a compressed spring 97 between them.

The indexing drive roll 95 is driven by a compressed air, variable stroke, rotary actuator, i.e., reciprocating air motor 130, which delivers an intermittent unidirectional output torque through a one-way clutch 132. The actuator is an off-the-shelf unit available commercially from Bimba Manufacturing Co. of Monee, Ill., among others, to which a Torrington overrunning clutch is added.

Figure 11:
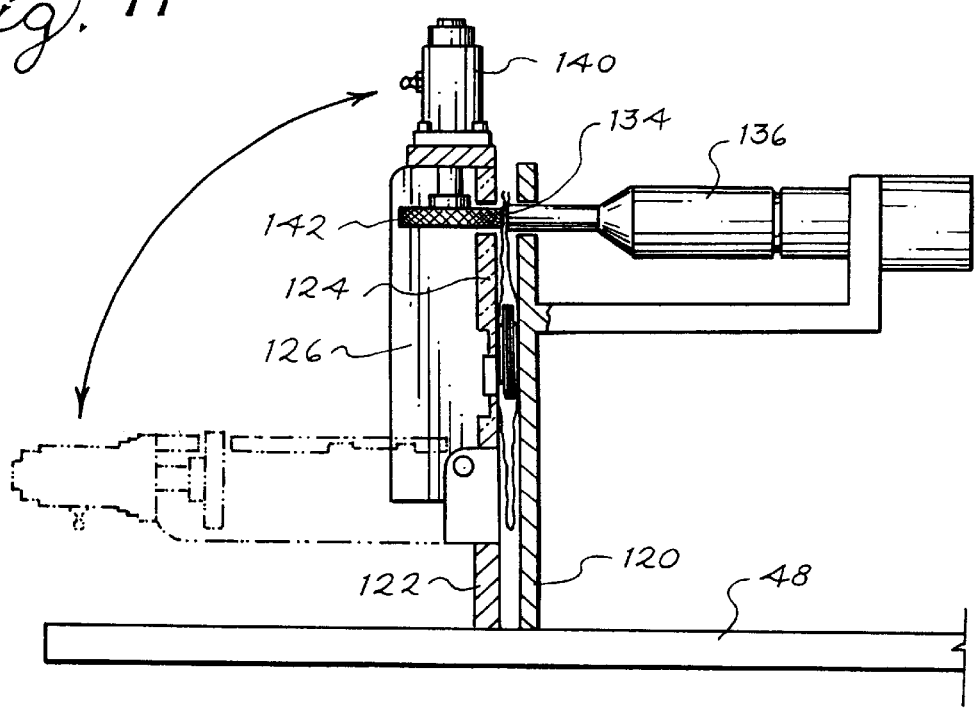
FIG. 11 is a partial sectional view showing the rotary anvil and ultrasonic probe in operative relation.

As the two-ply strip 59 with springs 97 inserted between its plies, is drawn forwardly by the indexing rolls 94–95, viz. from right to left in FIG. 1, the edges 66 of the two plies are united in a closing seam 134 which converts the two-ply strip 59 into a tube or sleeve. The closing seam 134 is made in the illustrated apparatus by an ultrasonically vibrating contact horn 136 positioned horizontally behind the rearmost upright plate 120, perpendicular thereto and to extend through a port in the plate 120 to contact the fabric strip 59 near its edges 66 (FIG. 11).

The upper cross bar 138 of the metal door frame 126 carries a bearing 140 for a knurled anvil wheel 142 which cooperates with the ultrasonic horn 136 to seam the folded two-ply fabric strip 59 into a sleeve after the insertion of the compressed springs 97, and as the folded strip is drawn forward intermittently by the indexing rolls 94–95. A bolt of the latch 128 on face of the forward plate 122 is received in a hole in the door frame 126 to secure it in the closed position with the anvil wheel 142 pressing the superimposed upper ply edges together and against the tip of the ultrasonic horn 136. When the indexing rolls 94–95 are intermittently driven, the simultaneous energization of the ultrasonic horn 136 seals the two plies together in a melt pattern which reflects the knurl pattern of the anvil wheel 142. The ultrasonic horn is de-energized while the fabric strip is at rest.

Figure 9:
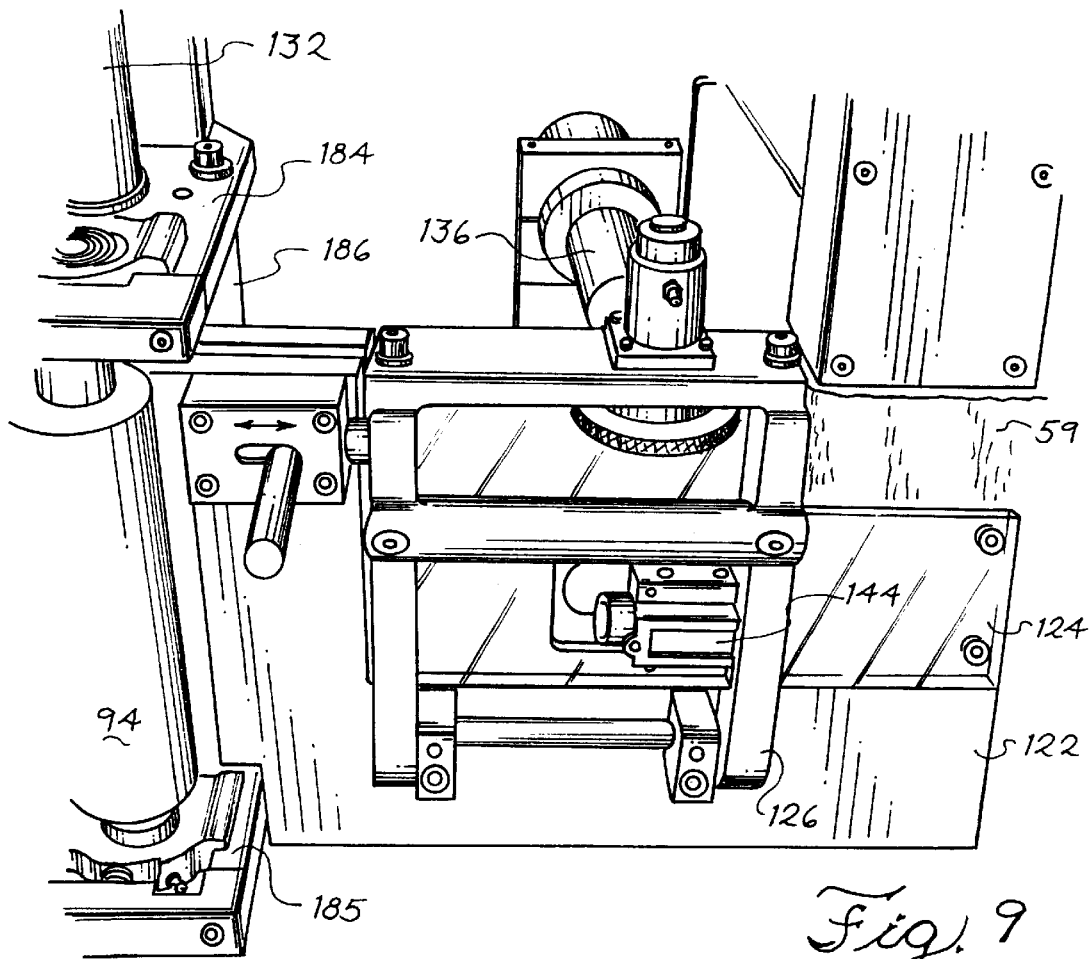
FIG. 9 is a partial front perspective view of the apparatus from eye level, showing the door-mounted anvil wheel and spring detector switch, and the indexing rolls which draw the material strip forward.
Figure 10:
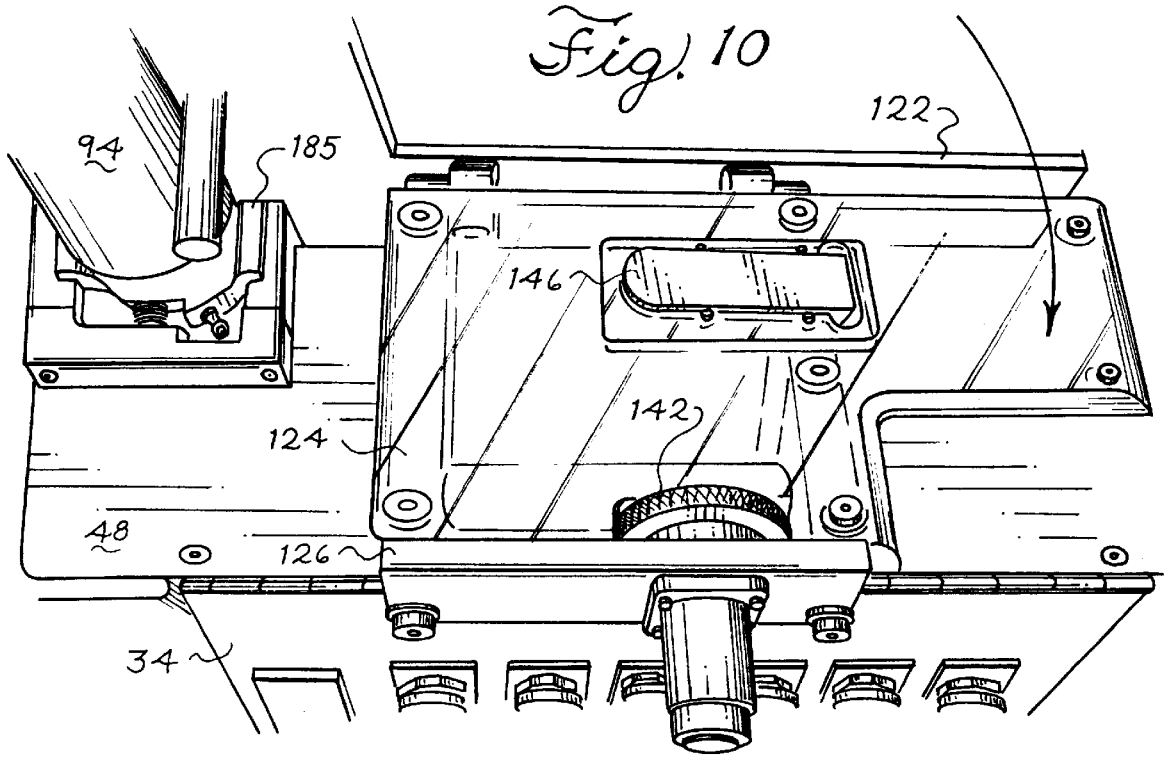
FIG. 10 is a perspective view similar to FIG. 9, but with the inspection door opened.

Mounted on the outside of the access door by direct attachment to the transparent panel 124 is a spring detector switch 144 (FIG. 9). It comprises an elongated horizontally extending leaf 146 (FIG. 10) which is positioned in a window milled in the transparent door panel 124, hinged at its "upstream" end, and spring-urged into contact with the adjacent fabric ply at a distance of one incremental indexing movement of the fabric downstream from the spring inserter station 96. The compressed springs 97 within the fabric plies keep the elongated spring leaf 146 depressed, and its associated normally-closed switch open. If the indexing movement of the fabric 59 fails to deliver a spring to the operating leaf of the detector switch, it closes and, through circuitry yet to be described, interrupts power to the apparatus until the operator determines and corrects the cause of the interruption, and resumes operation.

The Wire Supply, Spring Forming Compressing and Inserting Section

Spring wire 150 is supplied to a coiler 152 (FIGS. 1 and 7) from a motor-driven reel 154 (FIG. 1) through a wire-guide, tension sensing arm 156 connected electrically to energize the reel motor as needed to supply wire.

The coiler 152 is elevated above the bed plate 48 of the apparatus on a stand 158 bolted to the bed plate at the rear thereof, and having an upper mounting plate 160 slanted at 30 degrees downwardly toward the front of the apparatus to facilitate delivery of the formed spring coils 97. Wire is drawn into the coiler by a pair of grooved feed rolls 162 after first traversing the usual straightening roll sets. The wire is thrust by the feed rolls against a forming cam which oscillates to vary the diameter and pitch of the wire helix to produce a coil 97 of the desired shape, and of the desired load-carry after being compressed and subsequently re-expanded to the extent permitted by the pocket to be formed around it.

The coil 97, as it is being formed, rotates on its axis about a delivery rod 164 protruding perpendicularly from the frame of the coiler, and therefore descending forwardly at an angle of 30 degrees. The formed coil is severed from the incoming wire supply by an impact shearing tool activated as the nip of the feed rolls is momentarily relaxed. The action of the shearing tool delivers an axial impact to the severed spring, enhanced by gravity, to carry the formed coil 97 to a receiver trough 166 beneath the end of the delivery rod 164.

The coil-receiving trough 166 is a horizontal length of steel tubing attached at its forward end to the coil inserter mechanism 96 and open upwardly throughout most of its length by an end-milling pass tangent to the inner diameter along both sides of the tube to produce a straight wall extending vertically upwardly, tangent to the inside diameter of the half-cylindrical trough.

At its rear end, the trough 166 is supported by a post 168 standing upon the bed plate 48, as is the rod end of the aligned, long-stroke, coil compressor air cylinder 170, whose rear end is supported by a bracket 172 within the coiler stand 158. The coil compressor is a cylindrical plunger 174, slightly smaller in diameter than the coil-receiving trough 166, attached to the end of the piston rod of the air cylinder 170.

Figure 8:
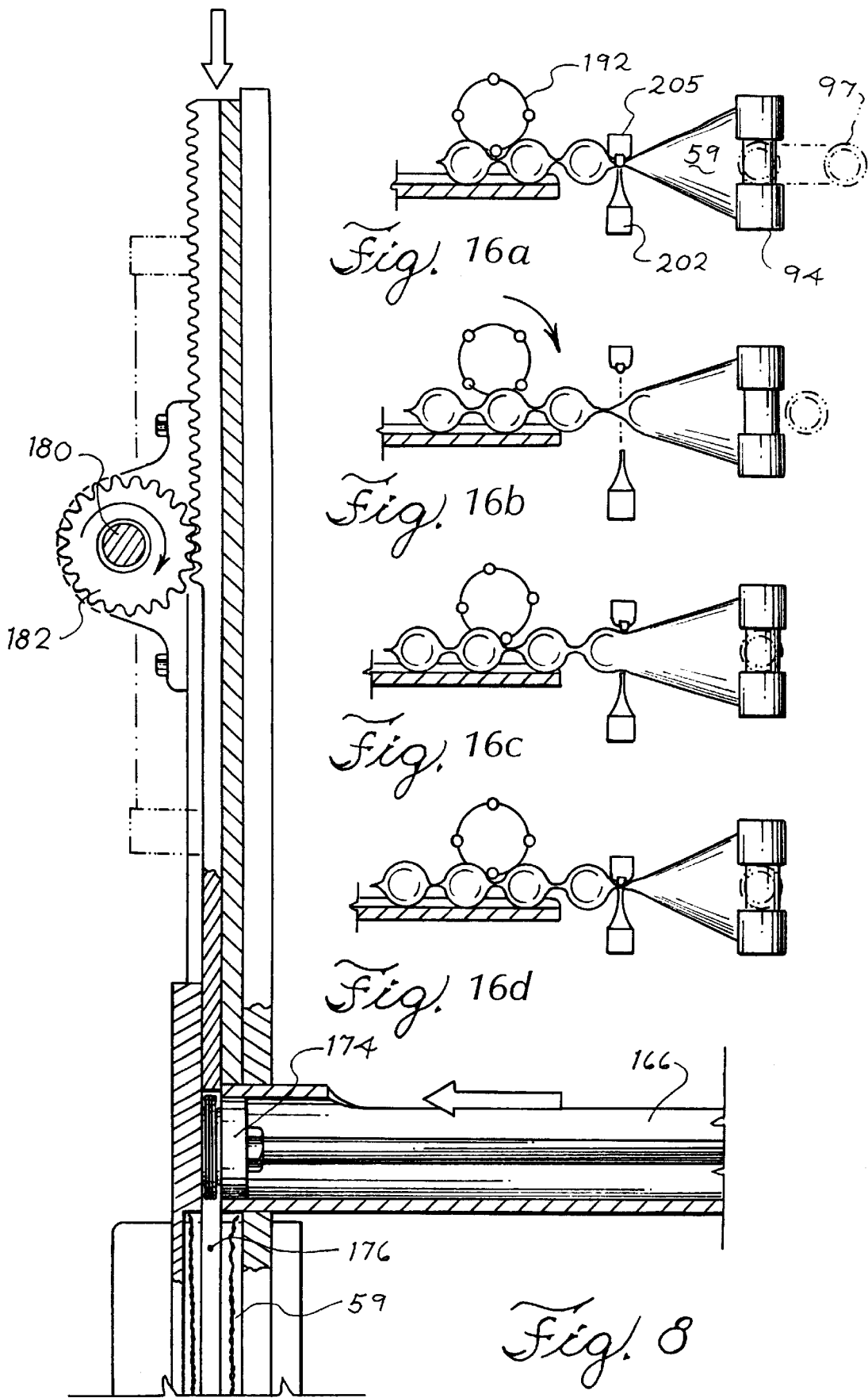
FIG. 8 is a partial sectional view of the spring compressor and inserter mechanisms, showing a spring fully compressed into the delivery slot of the inserter at the instant just prior to the downstroke of the inserter bar.

As the coil 97 settles into the trough 166, the coil compressor 174 moves forward through the trough, thrusting the coil forward into the coil opening of the inserter guide channel 176, and compressing it (FIG. 8). The compressor plunger 174 maintains the compression of the coil until the inserter slide bar 178 is actuated to deliver the compressed spring, and then retracts to clear the trough for receipt of the next spring.

The Spring Inserter Mechanism

The inserter mechanism is essentially that of my earlier pocketed spring machine of Pat. No. 4,439,977, but mounted for vertical movement of the delivery slide 178 to deposit compressed springs 97 between the plies of the pocket-forming strip from above, the strip being oriented in a vertical plane between the earlier-mentioned spaced plates 120 and 122.

Figure 7:
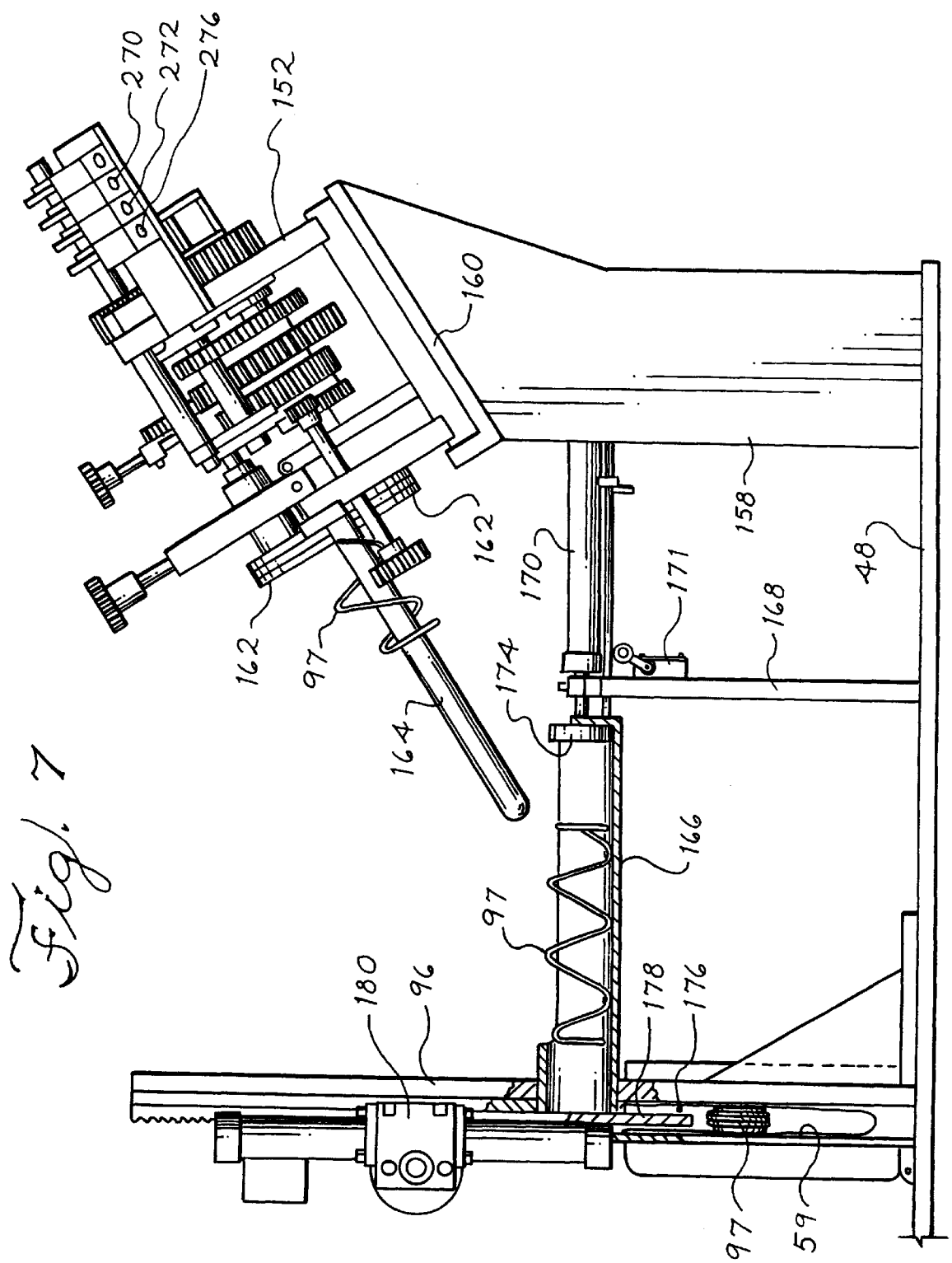
FIG. 7 is a side elevation, partly sectional, of the spring coiler and delivery rod in relation to the spring compressor and inserter.

The inserter slide 178 is a broad, flat bar mounted for endwise sliding movement in a covered guide channel 196 milled from solid nylon. The slide bar is formed with a half-round yoke at its spring-engaging end to engage the compressed spring 97 (FIG. 8), which is forced into the inserter guide channel 176 through a circular opening aligned with spring receiver trough 166 and compressor 174, and is held compressed by the compressor until the inserter bar 178 is activated to thrust the compressed spring downwardly through the inserter guide channel to deposit the spring between the two plies of the fabric strip 59 (FIG. 7). The compressor retracts when the compressed spring has moved beyond the guide-channel opening, in readiness to engage and deliver the next spring, and the inserter bar 178 retracts immediately upon deposit of the compressed spring.

The driver of the inserter bar 178 is a reciprocating rotary actuator 180 such as that used for the indexing drive rolls, except that the one-way clutch is omitted to permit the actuator to drive in both directions to first advance, and then immediately to retract, the inserter bar. The rotary output of the actuator is converted to linear motion by a pinion 182 engaged with a rack secured to the inserter bar.

The Indexing Drive

At the downstream end of the two upright plates 120 and 122 between which the folded fabric strip 59 travels and from which the encased compressed springs 97 emerge, the plates are beveled (FIG. 9) to conform approximately to the nip of the two vertically oriented indexing rolls 94–95.

The rolls are journalled at their ends in bearings in upper and lower horizontal plates 184–185 joined at the rear as a subframe by a vertical plate 186. The bearings of the rearmost roll are fixed while those of the forward roll are slidable toward and away from the fixed bearings, and spring urged to bring the two rolls into tight engagement with the two-ply sleeve 59 and the compressed springs 97 it contains. In their mid-portions, the two rolls are necked-down to pass the compressed springs 97 more easily but the end portions of the rolls must retain their firm grip on the upper and lower edges of the fabric sleeve 59.

Figure 12:
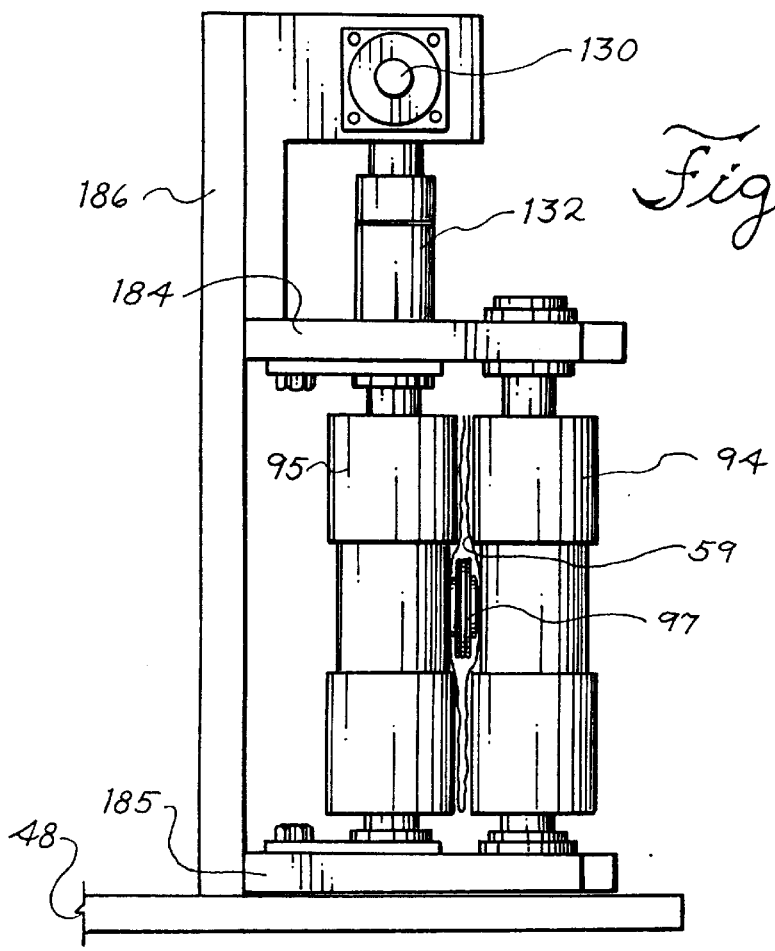
FIG. 12 is a partial elevational view of the indexing rolls and drive, seen from the delivery side.

The rearward, fixed-bearing roll 95 is the driven roll (FIG. 12). Its shaft is extended through its upper bearing and coupled to the output shaft of the one-way drive clutch 132 of an air-driven rotary actuator 130. The resulting motion of the indexing rolls is intermittent but unidirectional drive of the fixed index roll 95.

The rotary actuator 130 is adjustable, within limits, to deliver a variable amount of intermittent rotation of the indexing rolls 94–95, desired to accommodate the pocketing of springs of various diameters.

On each operation of the indexing rolls, a compressed spring 97 is released from compression as it emerges from those rolls, and expands itself axially as well as projecting itself forwardly as it straightens itself from the one-sided release of compression by the indexing rolls 94–95. As the spring expands, it moves forward within the fabric sleeve 59, its axially horizontal alignment therein being maintained by the horizontal cross seal 188 of the previous spring 97 into its pocket 190 (FIG. 15).

In the process, the sleeve 59 makes a 90 degree rotation relative to the spring 97 as it proceeds from the nip of the vertical indexing rolls 94–95 to the horizontal cross seal 188 of the previously encapsulated spring, expanding intermediately as a tetrahedral tent anchored vertically at the upstream end by the indexing rolls 94–95, and horizontally at the downstream end by the previously made cross seal 188 and the tension of the previously made strip of pocketed springs 97. The tension referred to may result from the mere weight of the strip of springs, but is preferably derived from a rotary extractor reel 192 (FIG. 14) driven unidirectionally by a rotary actuator 194 with overrunning clutch 196, in synchronism with the index rolls 94–95. The extractor reel 192 is, in effect, a sprocket consisting of four equi-spaced parallel rods 198 in a rotatable array, each inter-rod space receiving one of the pocketed coils to be pushed forward in succession along a flat delivery trough 200 by one of the bars 198 as the reel 192 rotates (FIGS. 15a, 15b, 15c, 15d).

The Pocket-Forming, Cross-Seam Mechanism

Figure 13:
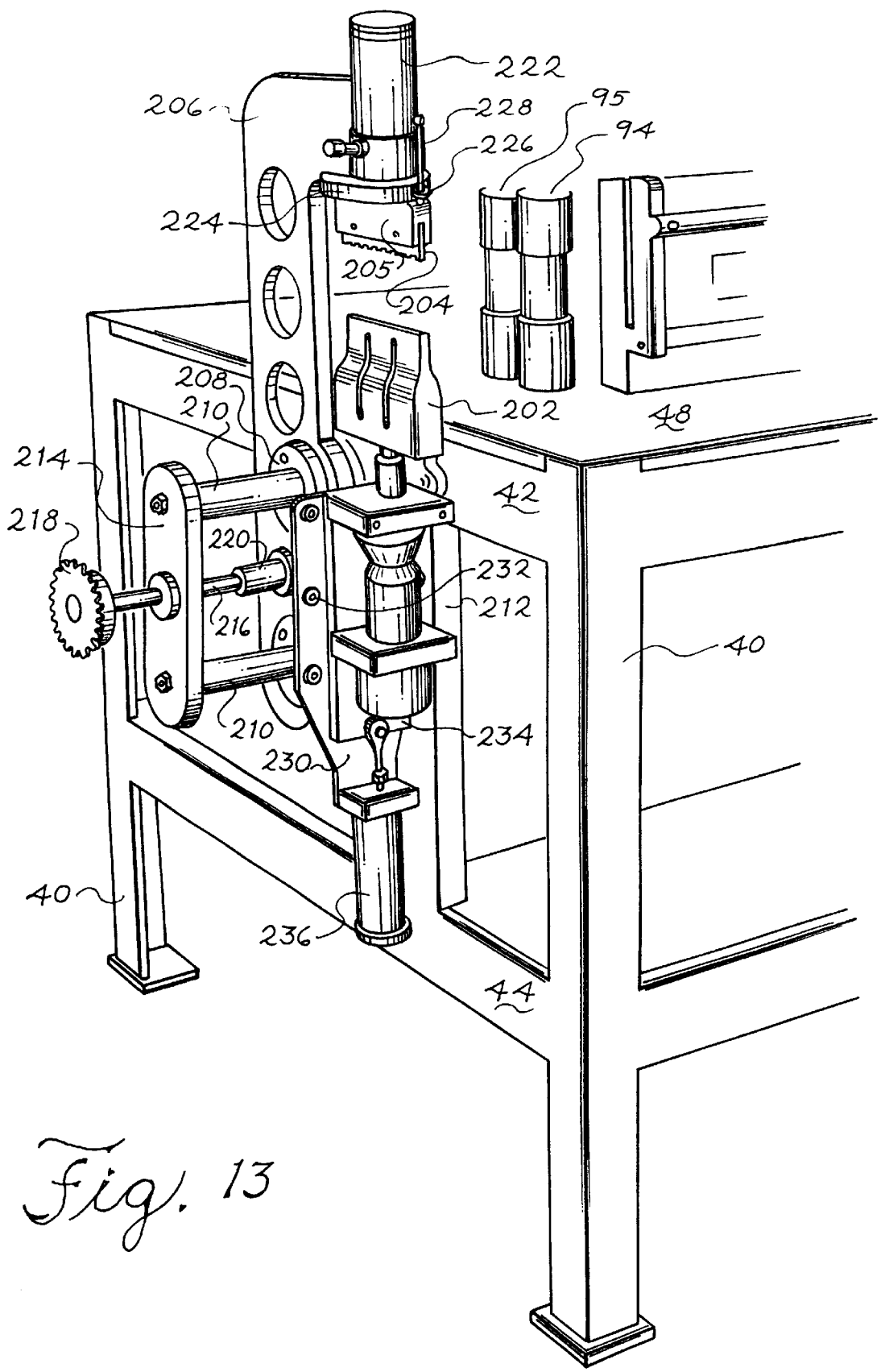
FIG. 13 is a perspective view of the delivery side of the apparatus showing detail of the cross-sealing mechanism and shiftable mounting.
Figure 14:
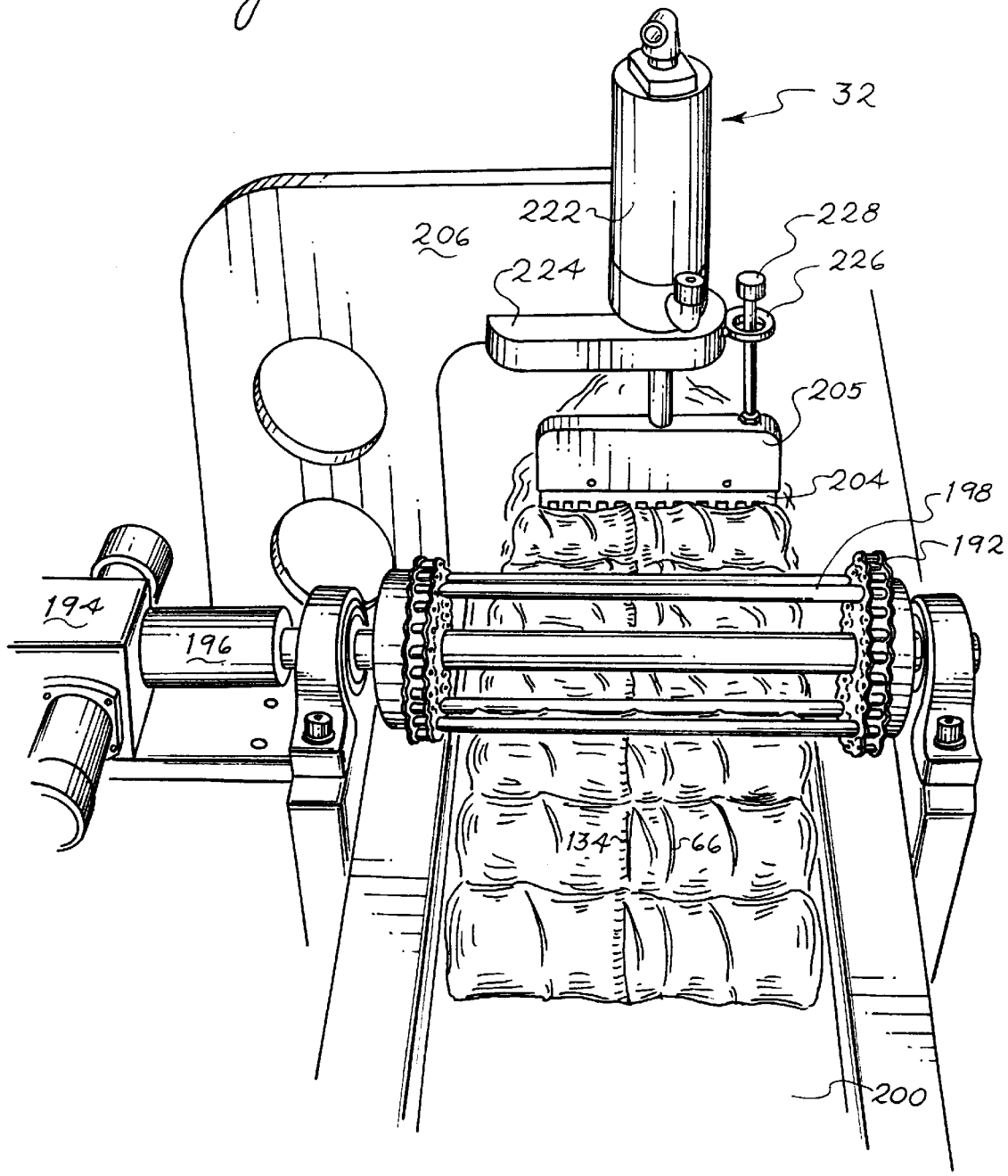
FIG. 14 is a partial perspective view of the delivery side of the apparatus, showing the overriding strip-tensioning reel.

Downstream from the indexing rolls 94–95 (i.e., left in FIG. 1), an ultrasonic horn 202 and opposing anvil 204 are positioned respectively below and above the path of the fabric sleeve 59 and expanded springs 97 issuing from the indexing drive rolls (FIGS. 13–15).

The horn 202 and the anvil 204 are supported by a movable subframe 206 in the form of a heavy C-shaped plate, which is slidably supported by slide bearings 208 on a pair of vertically spaced horizontal shafts 210 cantilevered from a vertical post member 212 secured to the upper and lower side rails 42–44 of the underframe of the apparatus, and extending in the direction of fabric flow through the apparatus. The two shafts 210 are connected at their free ends by a narrow plate 214 having a thrust bearing to journal a jack screw 216 turnable by a hand wheel 218 at its outer end, while its inner end is journalled in an opposing thrust bearing on the vertical post member 212. The screw engages a threaded sleeve 220 secured to the subframe 206 to move the subframe toward or away from the indexing rolls 94–95 to place the sealing horn and anvil in any desired position of adjustment of their distance from the indexing rolls.

The anvil 204 is an elongated, serrated bar having limited spring-loaded, lost motion into a slotted holder 205 secured to the piston rod of a double-acting air cylinder 222, which lowers the anvil to make a seal and subsequently raises it. The cylinder 222 is mounted on a horizontal plate 224 secured to the upper arm of the subframe 206, which also provides a guide bushing 226 to receive a pin 228 standing up from the anvil holder 205 to maintain the transverse alignment of the anvil.

The opposing spade-shaped ultrasonic sealing horn 202 and its transducer/driver are carried on the lower arm of the subframe 206. A vertical face plate 230 secured to the front edge of the lower arm of the subframe 206 provides six guide rollers 232 which confine a slide bar 234 for vertical movement driven by a double-acting air cylinder 236 mounted on the lower end of the face plate 230. Mounting blocks on the front face of the slide bar hold the sealing horn and transducer.

At the appropriate time, as determined by the control circuitry, the two air cylinders 222 and 236 are activated to bring the ultrasonic horn 202 and opposing anvil 204 into contact with the fabric sleeve 59 behind the newly expanded spring 97, camming the spring 97 forwardly toward the previously made cross seal 188 behind the previously encapsulated spring. When the horn is energized, it makes the new cross seal, which closes the newly expanded spring into a new pocket. See FIGS. 16a to 16d.

The process is cyclically repetitive, requiring only the making of an initial cross seam 188 under manual control of the apparatus, to provide a forward barrier against which to urge the first expanded spring, and a few additional individually pocketed springs sufficient to engage the extractor reel 192 atop the delivery trough 200. Operation thereafter may proceed automatically.

As earlier noted, the excess edge fabric 66 outwardly of the endless closing seam 134 of the fabric sleeve 59, having transferred itself to mid-height of the spring, becomes incorporated as well into each successive, pocket-closing cross seam 188 (FIGS. 14 and 15). The direction of the two-ply flap, i.e., lying right or left of the sleeve closing seam 134, is determined by the first cross seal 188 that is made, all others following the initially selected orientation.

As the fabric sleeve 59 formed by the longitudinal seaming 134 of the edges 66 of the plies carries the springs 97 through the nip of the indexing rolls 94–95, the springs expand to the extent permitted by the sleeve, and do so without changing their axial orientation and without requiring the axial re-orientation required by existing commercial procedures and apparatus. The procedure of this invention accordingly eliminates the dependence of pocketed-spring manufacture upon the barrel-shaped spring coil previously necessary to permit the spring to right itself when the pocket is exteriorly manipulated. Pocketed coils of the hourglass shape are now equally feasible.

As the horn 202 and anvil 204 come together behind the expanded spring, they cam the spring forwardly toward the forward cross seam 188 of that pocket, tensioning the material of the strip 59 about the spring, as well as tensioning the fabric between the cross-sealing mechanism 32 and the indexing rolls 94–95.

The position of the cross-sealing mechanism 32 relative to the indexing rolls is made adjustable along the fabric path to accommodate the setup of the apparatus to make pocketed springs of different diameter and spring heights; and together with the adjustable length of the stroke of the intermittent indexing roll drive 130, for the control of the pocket tension about the encapsulated spring, and thus of the freedom of the spring to compress.

Modification for Continuous Non-intermittent Operation

In the preferred form of the apparatus and mode of operation hereinbefore described in reference to FIGS. 1 to 16 of the drawings, the material feed rolls 68–69 deliver fabric continuously but the indexing rolls 94–95, which draw the folded fabric strip through the spring inserter mechanism 96 and the running closing-seal mechanism 26, are operated only intermittently, while the spring insertion and the cross-sealing to close the individual pockets are performed while the indexing rolls 94–95 and the two-ply fabric 59 downstream from the tension roll 92, are at rest.

With relatively slight change in the apparatus as disclosed, it may be rigged for constant running. The slight modifications for that purpose are illustrated in FIG. 17, and referred to again in the description of the control circuitry for both the preferred intermittent and the modified continuous forms of operation.

For continuous operation, the indexing rolls 94–95 are driven in synchronism with the continuously operating material feed rolls 68–69, preferably with speed controls of the gearhead motor 240 provided for continuous drive of the fixed bearing roll 95. Speed control is desirable to compensate for indeterminate variables in the tensile strength and resistance of the fabric strip 59 to stretching, for example, and in the wear of the roll surfaces, etc.

In addition, the cross-sealing mechanism 32, normally fixed in position relative to the indexing rolls 94–95, although adjustable to accommodate different spring diameters, must reciprocate. It moves against the product flow with "jaws" open, i.e., with ultrasonic horn 202 and anvil 204 retracted, and then reverses while the horn and anvil approach each other and seal the fabric sleeve 59 transversely, as at 188 in FIG. 15.

The reciprocal movement of the cross-sealing mechanism 32 is provided by replacing the jack screw 216 and handwheel 218 of FIG. 13 with a variable-stroke double-acting air cylinder 242 whose piston rod 244 is extended by a shaft 246 threaded where it passes through the subframe 206 to which it is adjustable secured by lock nuts on both sides of the plate subframe 206. The drive cylinder 242 is mounted to the end plate 214.

By this arrangement, the line of action of the sealing horn 202 and anvil 204, may be shifted relative to the stroke of the cylinder 242, and the stroke of the cylinder itself can be adjusted for further control of the positions of the cross-sealing mechanism relative to the index rolls 94–95, and to the expanded spring within the sleeve 59 after the spring is released from compression.

It remains to note that during continuous operation as described, the closing seal mechanism 26, i.e., the ultrasonic probe 136 and the anvil wheel 142, are likewise in continuous operation.

The Control Mechanism and Circuitry

Figure 18:
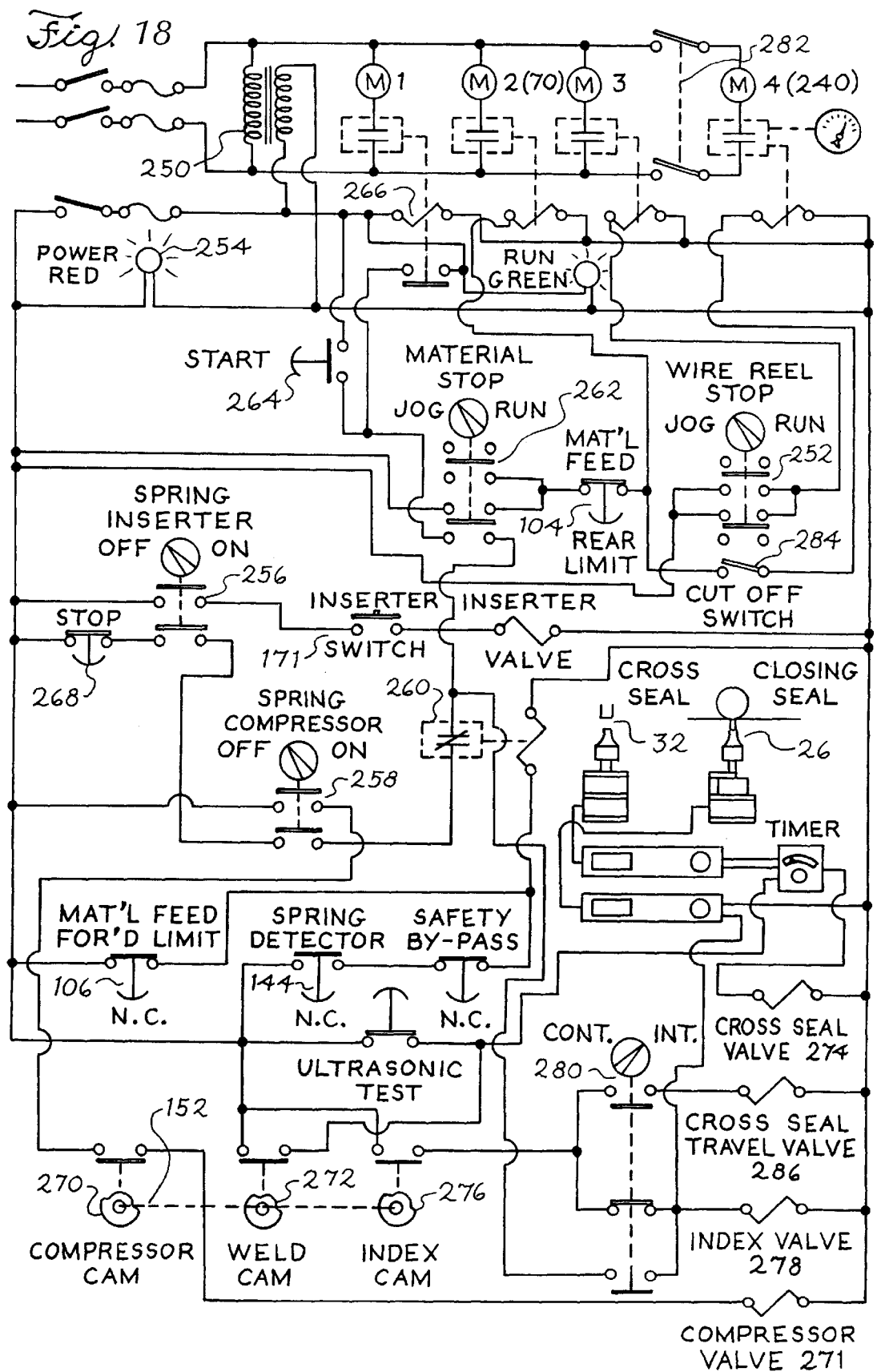
FIG. 18 is a diagram of the control circuitry which coordinates the sequential operations of the overlapping cycles of operation of the apparatus.

The various control elements, and the circuitry which unites them into a control system, are described in reference to the ladder diagram of FIG. 18.

Medium voltage suitable for powering the several drive motors, indicated as 440 v., is supplied in parallel to the primary side of a step-down transformer 250, to the coiler motor M1, the material feed motor 70, and the wire reel motor M3, of which the latter, with the exception of an on-off switch 252 to the wire-reel motor starter relay 254, is controlled internally of the reel stand by a tension-sensing wire guide support arm, a commercial unit available from Winreel, of California.

For simplicity, line voltage is shown as single phase whereas in reality, three-phase power would be supplied to the motors, and the transformer primary powered from one of the phases.

The secondary of the transformer 250 is connected through various switches, some manual, some operated by a set of programming cams driven by the coiler 152, and others serving as process inspectors, to operate the several relays and air cylinder valves employed, as well as the ultrasonic sealing mechanisms, and to interrupt power to the coiler motor upon a failure to provide either springs or pocket material.

Specifically, after power is supplied to the transformer primary, and the power switch from the secondary is closed to the control circuit, a red signal lamp 254 is illuminated to indicate that power to the system is "on."

Inasmuch as the program cams (lower left quadrant of FIG. 18) are mounted on a shaft extension of the coiler 152, the on-off switch 256 to the spring inserter control valve and the on-off switch 258 to the spring compressor control valve each carries a set of contacts connected in series with each other and with a normally closed monitor relay 260, to a set of contacts on the material feed motor on-off switch 262, and thence in parallel to a momentary start switch 264 and a holding relay 266 to the coiler-motor starter.

Thus, when the momentary manual start switch 264 to the coiler motor M1 is thereafter closed to energize the coiler motor starter relay, the holding relay 266 maintains that connection when the start switch 264 is released, and maintains the material feed motor M2 (70) and the coiler 152 and its control cams in operation until the occurrence of any of the following events:

a) the "stop" switch 268 is opened;

b) the spring inserter switch 256 is turned off;

c) the spring compressor switch 258 is turned off;

d) the normally closed spring detector switch 144, normally opened by the presence of springs, is closed by the absence of a compressed spring beneath its operating leaf 146; or e) the normally open front limit switch 106 of the fabric tension roll 92 is closed, signalling failure of the material supply.

Any of the foregoing occurrences energizes the normally closed monitor relay 260 to open, which in turn opens the holding relay 266 and interrupts power to the coiler motor M1 and to the material feed motor 70. The spring detector switch may be disabled by opening a manually operated, series connected by-pass switch when desired, as for threading the fabric strip into the apparatus in preparation for start-up.

The wire reel is energized independently through a manual multiple contact "jog-stop-run" switch, and thereafter operates under its own independent wire-tension monitor, as earlier stated.

The material feed motor 70 normally operates under the control of the slack-sensing inner limit switch 104 of the tension roll 92.

The individual air-powered operations are controlled by the program cams mounted side-by-side on an extension of a geared-down shaft of the coiler 152 (FIG. 7), and displayed from left to right in the diagram, FIG. 18 (lower left).

The compressor cam 270 energizes the compressor cylinder control valve 271, a single acting normally closed valve, and applies air pressure to the compressor cylinder 170 in the forward direction as long as the dwell of the cam maintains the switch closed. At the forward end of its stroke, the compressor plunger closes the normally open inserter switch 171 to energize the control valve of the inserter 96 to push the compressed spring 97 downwardly between the plies of the folded strip 59. The dwell of the compressor cam 270 is calculated to allow for the downward stroke of the spring inserter while the spring compressor is in the forward position in order to maintain the spring in compressed condition until swept below the path of the compressor, after which the spring return of the valve spool applies air pressure to retract the compressor plunger 174 from the receiver trough 166 to clear the way for receipt of the next spring.

The weld cam 272 closes the circuit to the timer of the cross-sealing ultrasonic horn 202 and to a control valve 274 through which the opposing air cylinders 222 and 236 are simultaneously pressurized to bring the cross-sealing anvil 204 down and to elevate the ultrasonic horn 202 in opposition to the anvil to make the cross seal. A manual switch 273 bypasses the weld cam switch to energize the cross-sealing horn 202 for test purposes.

The index cam switch 276 closes the circuit to the index valve 278 which pressurizes the rotary actuator 130 to drive the rolls 94–95 to advance the fabric strip 59 another increment. The circuit to the index valve 278 is closed through the middle contacts of a selector switch 280 which is shown closed as for intermittent running, and which serves to power the continuous sealing ultrasonic probe 136 as the fabric strip 59 advances.

The circuit of FIG. 18 makes alternate provision as well for continuous operation of the modification of FIG. 16.

The continuous drive of the index rolls 94–95 by the gearhead motor 240 contemplates the selective availability of power at line voltage to that motor through an appropriate cut-off switch 282, and the slaving of its starter to that of the material feed motor 70 through a further cut-off switch 284. With the selector switch 280 positioned for continuous running, the index valve is disabled, the index cam switch 276 is connected to operate the valve 286 for the cross seal travel cylinder 242, and the closing seal ultrasonic probe 136 is connected through the monitor relay 260 for operation concurrently with the coiler and material feed motors and with the motor 240 then driving the index rolls 94–95.

It will be appreciated from the foregoing description of the control system that the timing of the sequence of operations is controlled basically by the cam shaft of the coiler 152, the design of the cams taking into account the necessary period of operation of each air-powered function, with one notable exception, namely, the timing of the operation of the inserter 96 from the forward position of the compressor plunger 174.

The period of each repetitive cycle of operation, accordingly, is determined by the time required for the formation of a single coil, notwithstanding that the several operations are each carried out at some distance from one another, and may be operating upon a spring produced one or more machine cycles earlier.

Figure 19:
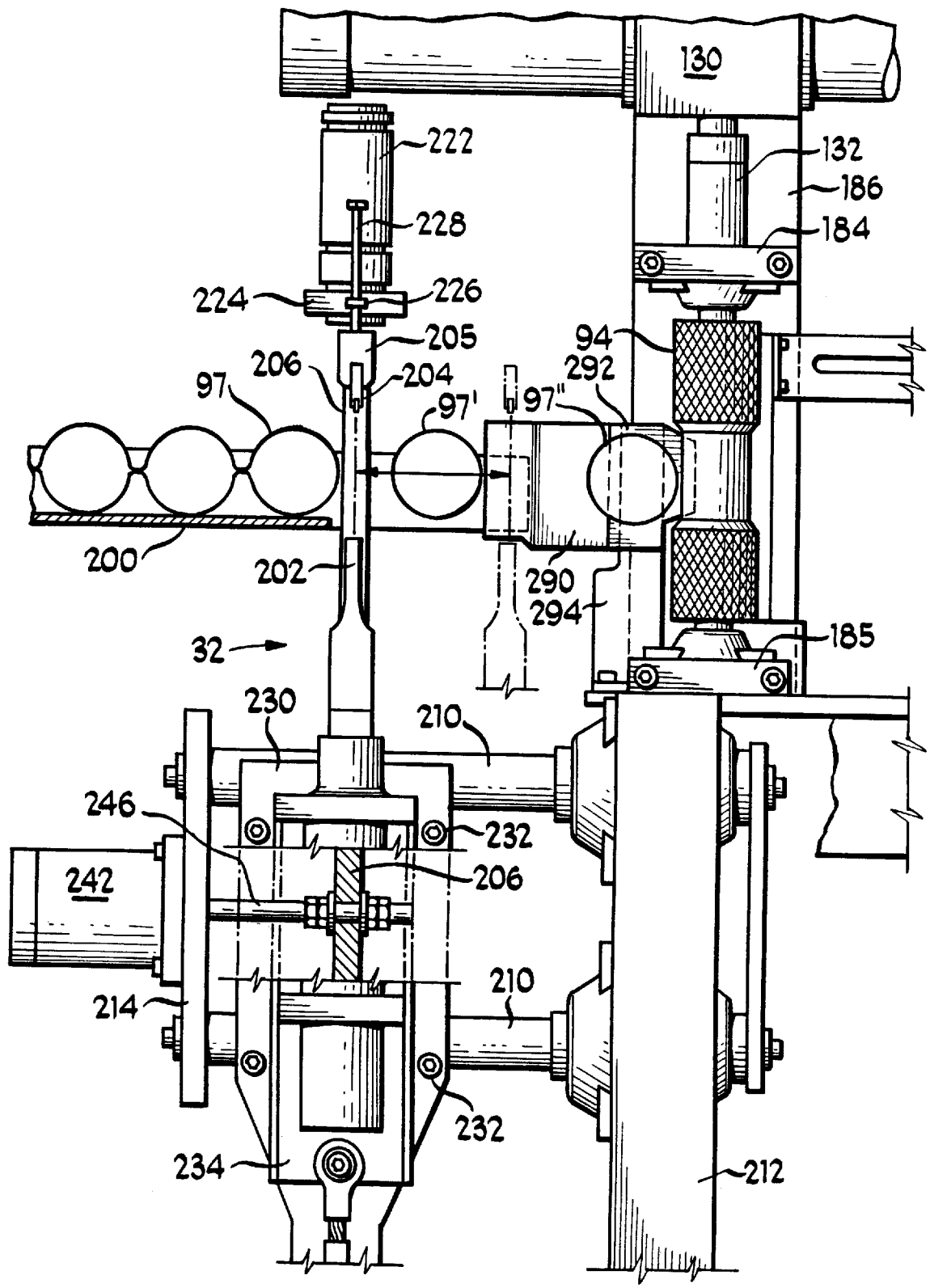
FIG. 19 is a front elevational view of the cross-sealing apparatus similar to FIG. 17, showing the cross-sealing apparatus further modified for use as an indexing mechanism, and eliminating the overriding strip-tensioning reel of the delivery trough.
Figure 20:
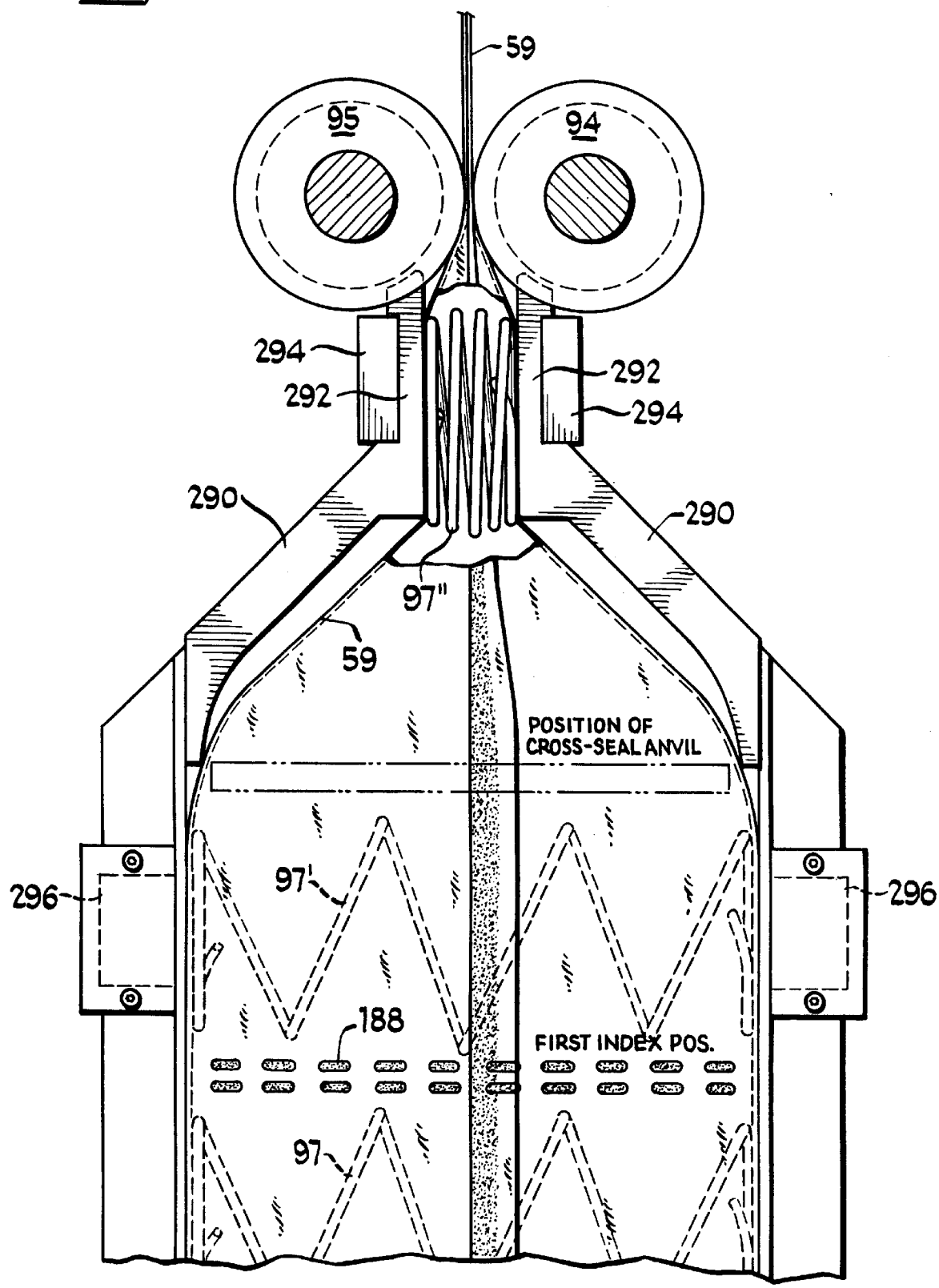
FIG. 20 is an enlarged fragmentary plan view of the apparatus of FIG. 19 showing the spring expansion-control plates which initially receive and temporarily hold the compressed spring emerging from the indexing rolls.

The Further Modification of FIGS. 19 to 21

In the course of operating the prototype apparatus of FIGS. 1 to 16, it was discovered that when operating with spring wire of non-uniform character, the springs produced by the coiler were likewise non-uniform and sometimes resulted in a spring-end tang inadequately tucked into the interior of the spring. An end of such a spring would occasionally drag or snag on its leap forward from its release by the indexing rolls, and position itself diagonally in the tetrahedral tent instead of parallel to the previously captured and pocketed spring.

While the snagging of springs was not experienced when operating with reasonably uniform wire, even within coils of wire which incorporate occasional abnormalities, the widespread geographic market for machines of this type suggests the likelihood of exposure to substandard, non-uniform wire, and the desirability of measures to avoid the spring-cocking problem it was found sometimes to cause.

As the problem, when it would sporadically and unaccountably intrude itself into an otherwise smooth operation, appeared to be associated with the forward bound of the spring upon its release from the nip of the indexing rolls, provision has been made in the modification of FIGS. 19 to 21 to control the forward movement of the expanding spring within the tetrahedral tenting of the fabric sleeve.

Control is provided by a pair of cooperating metal guide plates 290 between which the compressed spring 97 and surrounding sleeve 59 are deposited by the indexing rolls 94–95 at the end of the indexing movement, instead of being released by the indexing rolls for immediate expansion into the tetrahedrally tented portion of the sleeve 59. The guide plates 290 receive the compressed spring 97 and sleeve 59 from the indexing rolls into the space between their parallel entry ends 292 which closely approach the necked-down central portions of the rolls 94–95, and from which the plates 290 diverge from each other at an angle slightly less than a right angle. The guidance of the bounding expansion of each successive compressed spring 97 provided by the divergent guide plates has shown itself capable of delivering each new spring 97' forwardly to a position adjacent to and generally parallel to, its predecessor spring 97, already enclosed within its own pocket in the sleeve, as shown in FIG. 20, while the next compressed spring 97" in succession rests between the parallel entry ends 292 of the guide plates, awaiting its turn to jump on the next index of the sleeve 59.

Figure 17:
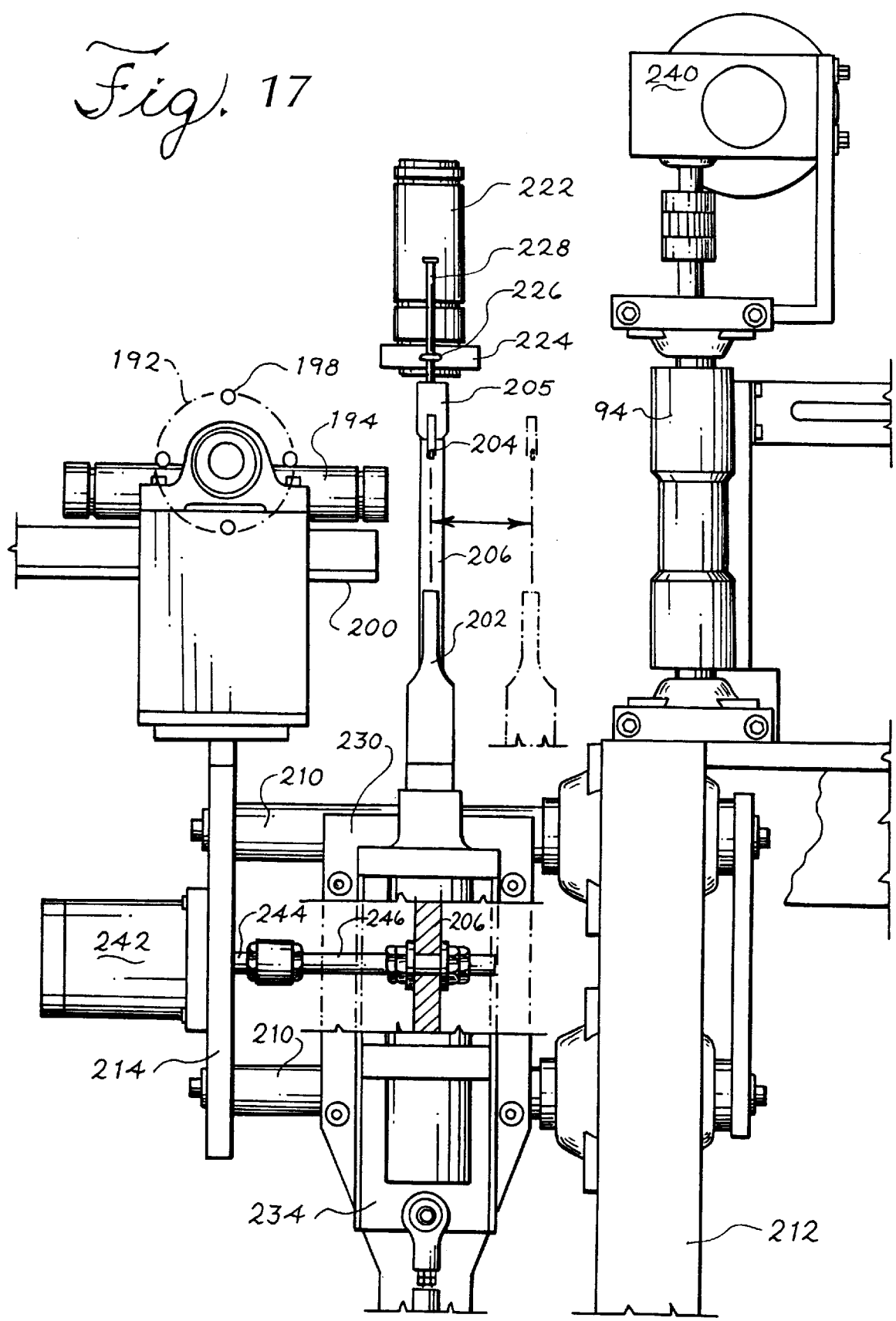
FIG. 17 is a front elevational view of the cross-sealing apparatus, as modified for continuous operation of the indexing rolls, as distinguished from intermittent.

In this modification, as distinguished from that of FIG. 17, the intermittent rotary actuator drive 130 of the indexing rolls 94–95 is retained, and combined with the reciprocable cross-sealing mechanism earlier described for continuous operation and shown in FIG. 17. The latter serves double duty in this modification as maker of the cross seal (transverse, pocket-separating seam) 188, and also as the downstream indexing mechanism, pushing each spring 97 along while and after defining its confining pocket by making another cross seal 188, and simultaneously drawing the fabric sleeve 59 and the next compressed spring 97 forward between the diverging guide plates 290, into which it was deposited by the indexing rolls.

The position of the reciprocable cross-sealing mechanism 32 when its anvil 204 and sealing horn 202 have been retracted after making a cross-seaming, double-line, interrupted weld behind the expanded spring 97 to complete the pocket about that spring, is shown in solid lines in FIG. 19. In that position, with "jaws" open, so to speak, it is prepared to retreat to its starting position for making the next cross-seam, the starting position of the anvil and horn being shown in broken lines in FIG. 19. In retreating from the solid line position to its broken line position, the "jaws" of the cross-sealing mechanism pass rearwardly over the expanded next spring 97', which sprang forward from between the parallel entry ends 292 of the guide plates 290 when the sleeve 59 was drawn forward by the sealing of the spring 97 in its pocket and the forward indexing movement of the cross-sealing mechanism.

The described retreating movement of the cross-sealing mechanism is that which occurs between FIG. 21b and FIG. 21c of the multiple diagrams of FIG. 21, during which time there has been no advancing movement of the index rolls 94–95.

The cross-seaming cycle beings with the closing of the anvil and ultrasonic horn toward one another, i.e., FIG. 21c to FIG. 21d, which has the effect of drawing the fabric sleeve 59 taut about the expanded spring 97'. This clinching of the fabric sleeve by the closing of the cross-sealing horn 202 upon the anvil 204 tensions the sleeve 59 between the sealing mechanism and the indexing rolls 94–95, the grip of which upon the fabric sleeve is enhanced by providing the enlarged end portions of the rolls with knurled metal sleeves. As the sleeve 59 is firmly held by the indexing rolls, the clinching of the sleeve about the newly enclosed spring 97' also draws the chain of previously pocketed springs slightly rearwardly on the delivery chute 200, as shown in FIG. 21d, until the sealing mechanism 32 indexes forwardly, simultaneously with the indexing movement of the index rolls 94–95, and advances the chain of completed pocketed springs to the position of FIG. 21e.

FIG. 21e shows the sealing and indexing upon completion. It coincides with FIG. 21a, except for showing one more spring, 97', added to the chain, and the next spring, 97", advanced to the front of the expanded tetrahedral tent portion of the sleeve 59, ready to be sealed into its own pocket by a repetition of the described cycle.

When employing the reciprocable cross-sealing mechanism 32 in conjunction with intermittent operation of the indexing rolls 94–95, the rotary extractor reel 192 overriding the completed pocketed chain of pocketed springs on the delivery chute 200 is removed as unnecessary, and the cross-sealing horn 202 and anvil 204 are used to push the latest enclosed spring and its predecessors along the delivery trough 200. For that purpose, as noted, and the closing of the anvil 204 and horn 202, the forward travel of the cross-sealing mechanism 32 are synchronized with the movement of the indexing rolls 94–95. In the electrical circuit of FIG. 17, the selector switch 280 would be positioned to "intermittent", and the power input to the index valve 278 jumpered by separate switch (not shown), or direct connection, to the input side of the cross seal travel valve 286.

The floor of the delivery trough 200 begins just beyond the downstream position of the sealing horn 202 and anvil 204, while the angle-section side rails of the delivery trough are extended rearwardly to flank the distal ends of the guide plates 290. The guide plates 290, in turn, are supported at their parallel entering ends 292 by spaced individual brackets 294 upstanding from and secured to the bed plate 48 of the machine support 20.

Near the ends of the rearwardly extended side rails of the delivery chute 200, on the outer surface of each rail, a permanent magnet has been mounted as optional insurance against any rebound of the expanded spring from its forward lodgement in the tetrahedral tent after bounding forward upon its abrupt release from compression. The aluminum of the side rails of the delivery chute, selected for lightness to facilitate manual handling of the chute, is conveniently transparent to the magnetic field, which attracts and holds the end convolutions of the steel coil pending the clinching of the tented fabric sleeve (FIG. 21d).

As the guide plates 290, as shown in FIGS. 19 and 20, are spaced from the index rolls 94–95 in the downstream direction of product flow, forward transport of the compressed spring 97" from between the parallel entry ends 292 of the guide plates 290 is provided by the coordinated forward draft of the fabric sleeve 59 to release the spring for expansion. This forward draft of the sleeve 59 is provided in turn, in the modification of FIGS. 19 to 21, by the indexing of the cross-sealing mechanism 32. In the apparatus of FIGS. 1 to 16, wherein the cross-sealing mechanism 32, although adjustable in position along the flow path, is normally fixed in position, the timed forward draft of the sleeve 59 is performed by the extractor reel 162 atop the delivery chute 200.

The features of the invention believed new and patentable are set forth in the following claims.

What is claimed is:

1. In an apparatus for making a series of pocketed springs individually contained in pockets defined between two plies of a strip of sheeting by the spaced transverse seaming of said plies, wherein the apparatus includes:
   a support,
   closely spaced walls on said support defining between said walls a planar path for the movement of said strip longitudinally thereof through the apparatus along said path, drive means on said support engageable with said strip to advance the strip along said path, a spring inserter on said support for inserting axially compressed springs between the plies of said strip with their axes perpendicular to said plies and in spaced relation longitudinally of said strip, longitudinal seaming mechanism on said support for joining the edges of said plies together upstream of said drive means to form a sleeve about said compressed springs, and transverse seaming mechanism on said support for defining said pockets within said sleeve between successive transverse seams, the improvement wherein the drive means comprises a pair of rolls engaging opposite faces respectively of said strip at the exiting end of said planar path to draw said strip forward along said path to release said compressed springs for axial expansion against said plies within said sleeve, said transverse seaming mechanism being located a predetermined distance downstream from said pair of drive rolls and oriented to make said transverse seams perpendicular to the plane of said path so as to include therein the longitudinal seaming of the sleeve between the ends of the transverse seams, and between the ends of the expanded spring captured in the pocket formed around each expanded spring by successive transverse seams.

2. The improvement of claim 1 wherein said predetermined distance is adjustable.

3. The improvement of claim 1 wherein the sheeting of said strip is thermally weldable and the seaming mechanisms are ultrasonically vibratable horns which weld said plies together by contact pressure of the vibrating horn against the plies backed by an anvil, and the horn of the transverse seaming mechanism and its opposing anvil are each mounted for concurrent movement toward and away from welding engagement.

4. The improvement of claim 3 wherein the transverse seaming horn and its associated anvil are mounted on said support through an intermediate frame movably mounted on said support for adjustment of said predetermined distance, and said transverse horn and associated anvil are each movably mounted on said intermediate frame for movement toward and away from each other.

5. The improvement of claim 1 wherein the sheeting of said strip is thermally weldable and the seaming mechanisms are ultrasonically vibratable horns which weld said plies together by contact pressure of the vibrating horn against the plies backed by an anvil, the anvil against which the edge of the plies are seamed is a freely rotatable knurled wheel which rotates about an axis transversely parallel to said path and is turned by the movement of said strip along said path to leave its knurled pattern in the weld produced, and said rotatable anvil serves as a guide and support for the strip against lateral forces exerted upon the strip by the insertion of the springs.

6. The improvement of claim 5 wherein the advancing movement of the strip is intermittent, the spring inserter operates when the strip is at rest, and the longitudinal seaming mechanism operates to join said edges while the strip is in motion.

7. The improvement of claim 6 wherein the transverse seaming horn and its associated anvil are mounted on said support through an intermediate frame movably mounted on said support for reciprocal movement of predetermined stroke toward and away from said rolls, said horn and anvil being mounted upon said intermediate frame for reciprocal movement toward and away from sealing contact with each other, and coordinated actuators connected respectively between said support and said rolls, and between said support and intermediate frame, and between said intermediate frame and said horn and associated anvil, respectively, to separate said horn and anvil upon movement of said intermediate frame toward said rolls and to close said horn and anvil upon said strip at the beginning of the movement of the intermediate frame away from said rolls.

8. The improvement of claim 7 wherein the said reciprocal movement of the intermediate frame is adjustable in the distance of its stroke from said rolls, and in the length of its stroke.

9. The improvement of claim 8 wherein said closely spaced walls and the plane of the path therebetween are vertical and the movement of said strip therealong is horizontal, the reciprocal movement of said intermediate frame is horizontal and the reciprocal movement of the horn and anvil of the transverse seaming mechanism is vertical.

10. The improvement of claim 5 wherein the advancing movement of the strip is continuous, the transverse seaming horn and its associated anvil are mounted on said support through an intermediate frame movably mounted on said support for reciprocal movement of predetermined stroke toward and away from said rolls, said horn and anvil being mounted upon said intermediate frame for reciprocal movement toward and away from sealing contact with each other, and coordinated actuators connected between said intermediate frame and said horn and associated anvil to separate said horn and anvil upon movement of said intermediate frame toward said rolls and to have closed said horn and anvil upon said strip at the end of the movement of the intermediate frame away from said rolls.

11. The improvement of claim 10 wherein the said reciprocal movement of the intermediate frame is adjustable in the distance of its stroke from said rolls, and in the length of its stroke.

12. The improvement of claim 11 wherein said closely spaced walls and the plane of the path therebetween are vertical and the movement of said strip therealong is horizontal, the reciprocal movement of said intermediate frame is horizontal and the reciprocal movement of the horn and anvil of the transverse seaming mechanism is vertical.

13. The improvement of claim 1 wherein said closely spaced walls and the plane of the path therebetween are vertical and the movement of the strip along said path is horizontal, the spring inserter includes a delivery chute positioned between the plies of the strip and having therein a reciprocable plunger to transfer into said strip between said plies a spring compressed into said chute, said apparatus includes on said support an upwardly-open horizontal spring-receiving trough communicating with said chute, and aligned therewith a reciprocable plunger for delivering and compressing into said chute a spring reposed in said trough, and interlocking control means to operate said inserter plunger only upon and during the presence of a fully compressed spring in said chute and thereafter to retract both plungers for the receipt by said trough of another spring.

14. The combination of claim 13 wherein the support carries a coiler for producing helical-coil wire springs, said coiler being elevated above the spring receiving trough and displaced axially from said trough in the direction away from the spring inserter, said coiler including a delivery rod about which the helical wire spring is formed, said rod being aligned axially with said trough and extending downwardly from the elevated coiler at a substantial angle to terminate above the trough and to deposit axially-horizontal therein, by gravity, the helical coil springs produced individually by said coiler.

15. The combination of claim 14 wherein said substantial angle is thirty degrees from the horizontal.

16. The combination of claim 13 wherein the two-ply strip is a thermally weldable single-ply strip of sheeting folded upon itself longitudinally with its edges substantially aligned and uppermost as it travels said path, said apparatus including a strip-folding mechanism for folding said single-ply strip drawn from a continuous supply thereof into said two-ply strip, said folding mechanism including a carriage having thereon a horizontally journalled guide roll parallel and adjacent to a flat V-shaped folding frame depending from said carriage with downwardly pointed right angle vertex, and spaced therefrom on the side thereof opposite said guide roll a pair of members defining between them a vertical slot aligned with said vertex to confine and redirect the folded strip formed by the passage of the single-ply strip from and around said guide roll downwardly along the roll-adjacent face of the folding frame and inwardly along the opposite face thereof to said slot, a pair of edge guides mounted on said carriage in association with said guide roll to engage and center the single-ply strip between them as it traverses said guide roll, said edge guides being centered upon said vertex and respectively engaged by one of two threads of equal pitch and opposite hand on a common rod journalled on said carriage, said rod when turned altering the spacing of said edge guides while maintaining them centered on said vertex, said carriage being mounted for control of its height relative to said planar path of the folded strip to present said aligned edges at the same height relative to said longitudinal seaming mechanism irrespective of the width of the folded strip entering the apparatus.

17. The combination of claim 13 wherein:

the series of pocketed springs are conveyed away from said transverse seaming mechanism on a trough which receives the series of springs with their axes horizontal and transverse to said trough, said trough being surmounted by a strip-tensioning mechanism successively engageable with each pocketed spring to move the same away from said transverse seaming mechanism concurrently with the operation of said drive means to maintain tension in said strip.

18. The combination of claim 17 wherein:

the strip-tensioning mechanism comprises a rotary cage of spaced bars parallel to the axis of rotation of the cage and transverse to said trough so as to sweep a path above the trough intersecting said series of pocketed springs, said cage being rotated concurrently with said drive rolls to cause each bar in turn to engage one of said pocketed springs to advance the series of springs as the cage rotates.

19. The improvement claim 1 wherein:

the series of pocketed springs are conveyed away from said transverse seaming mechanism on a trough which receives the series of springs with their axes transverse to said trough, said trough being surmounted by a strip-tensioning mechanism successively engageable with each pocketed spring to move the same away from said transverse seaming mechanism concurrently with the operation of said drive means to maintain tension in said strip.

20. The combination of claim 1 wherein said planar path is extended beyond said drive rolls by guide plates which diverge from each other to permit and control the expansion of each compressed spring within said sleeve as the spring emerges from said path, the transverse seaming mechanism is mounted on said support through an intermediate frame movably mounted on said support for reciprocal movement of predetermined stroke toward and away from said rolls in alignment with said path, coordinated actuators are connected between said support and said drive rolls and intermediate frame, respectively, to drive said rolls intermittently in synchronism with the movement of said intermediate frame and transverse seaming mechanism away from said rolls, said transverse seaming mechanism serving to advance each captured spring by its movement away from said rolls.

21. The combination of claim 20 wherein the sheeting of the strip is thermally weldable and the seaming mechanisms are ultrasonically vibratable horns which weld said plies together by contact pressure of the vibrating horn against the plies backed by an anvil, the horn and anvil of the transverse seaming mechanism are each mounted on said intermediate frame for movement toward and away from welding engagement with said sleeve behind each expanded spring emerging from said path, second coordinated actuators are connected respectively to said horn and said anvil to move them toward and away from engagement with said sleeve, said second coordinated actuators being synchronized with said first mentioned coordinated actuators to close said transverse seaming horn toward its associated anvil prior to movement of said intermediate frame away from said rolls, and to disengage said horn and anvil from said sleeve to pass around the captured spring upon the return movement of said intermediate frame toward said rolls.

22. The combination of claim 21 wherein said closely spaced walls and the plane of the path therebetween are vertical, said rolls are journalled on vertical axes, and the movement of the strip along said path is horizontal, the movement of said horn and anvil of the transverse seaming mechanism toward and away from each other is vertical and said horn and anvil meet in linear horizontal contact, said sleeve, between its upright position between said rolls and the horizontal cross-seam made by said movable horn and anvil, being configured as a tetrahedral tent into which each compressed spring bounds forwardly upon its release from compression to lodge between the walls of said sleeve diverging rearwardly and horizontally from said cross-seam.

23. The combination of claim 22 wherein the anvil of the longitudinal seaming mechanism is a freely rotatable knurled wheel which rotates about a vertical axis and is turned by the movement of the strip along said path to leave its knurled pattern in the weld produced, and said rotatable anvil serves as a guide and support for said strip against lateral forces exerted upon the strip by the insertion of the springs.

24. The combination of claim 22 wherein a delivery trough is provided to carry the series of pocketed springs away from said cross-seaming mechanism by the successive advancing movements of said cross-seaming mechanism as each successive expanded spring is captured and advanced.

25. The combination of claim 22 wherein the horn and anvil of said transverse seaming mechanism are mounted on said support through an intermediate frame movably mounted on said support for reciprocal movement of predetermined stroke forwardly away from said rolls in the direction of movement of said strip along said path and then rearwardly toward said rolls, said transverse seaming horn and anvil being movably mounted on said intermediate frame for movement toward and away from welding engagement with said sleeve, said stroke of said intermediate frame being adjustable in length and placement relative to said rolls, coordinated actuators connected between said support and said rolls, between said support and said intermediate frame, and between said intermediate frame and said horn and anvil of the transverse seaming mechanism to close said horn and anvil into welding engagement with said sleeve to form a seam, and to cause said rolls to advance said strip intermittently concurrently with the forward stroke of said intermediate frame, said coordinated actuators thereafter disengaging said transverse-seaming horn and anvil from said sleeve to pass around the captured spring and thereafter to reverse the stroke of the intermediate frame toward said rolls to position said transverse-seaming horn and anvil for another seam to enclose the next expanded spring.

26. In an apparatus for making a series of pocketed springs individually contained in pockets defined between two plies of a strip of sheeting by the spaced transverse seaming of said plies, wherein the apparatus includes:

a support, closely spaced walls on said support defining between said walls a planar path for the movement of said strip longitudinally thereof through the apparatus along said path, drive means on said support engageable with said strip to advance the strip along said path, a spring inserter on said support for depositing axially compressed springs between the plies of said strip with their axes perpendicular to said plies and in spaced relation longitudinally of said strip, longitudinal seaming mechanism on said support for joining the edges of said plies together upstream of said drive means to form a sleeve about said compressed springs, and transverse seaming mechanism on said support for defining said pockets within said sleeve between successive transverse seams, the improvement wherein:

said closely spaced walls and the plane of the path therebetween are vertical and the movement of the strip along said path is horizontal, the spring inserter includes a delivery chute positioned between the plies of the strip and having therein a reciprocable plunger to transfer into said strip between said plies a spring compressed into said chute, said apparatus includes on said support an upwardly-open horizontal spring-receiving trough communicating with said chute, and aligned therewith a reciprocable plunger for delivering and compressing into said chute a spring reposed in said trough, and interlocking control means to operate said inserter plunger only upon and during the presence of a fully compressed spring in said chute and thereafter to retract both plungers for the receipt by said trough of another spring.

27. The combination of claim 26 wherein the support carries a coiler for producing helical-coil wire springs, said coiler being elevated above the spring receiving trough and displaced axially from said trough in the direction away from the spring inserter, said coiler including a delivery rod about which the helical wire spring is formed, said rod being aligned axially with said trough and extending downwardly from the elevated coiler at a substantial angle to terminate above the trough and to deposit axially-horizontal therein, by gravity, the helical coil springs produced individually by said coiler.

28. The combination of claim 27 wherein said substantial angle is thirty degrees from the horizontal.

29. The combination of claim 26 wherein the two-ply strip is a thermally weldable single-ply strip of sheeting folded upon itself longitudinally with its edges substantially aligned and uppermost as it travels said path, said apparatus including a strip-folding mechanism for folding said single-ply strip drawn from a continuous supply thereof into said two-ply strip, said folding mechanism including a carriage having thereon a horizontally journalled guide roll parallel and adjacent to a flat V-shaped folding frame depending from said carriage with downwardly pointed right angle vertex, and spaced therefrom on the side thereof opposite said guide roll a pair of members defining between them a vertical slot aligned with said vertex to confine and redirect the folded strip formed by the passage of the single-ply strip from and around said guide roll downwardly along the roll-adjacent face of the folding frame and inwardly along the opposite face thereof to said slot, a pair of edge guides mounted on said carriage in association with said guide roll to engage and center the single-ply strip between them as it traverses said guide roll, said edge guides being centered upon said vertex and respectively engaged by one of two threads of equal pitch and opposite hand on a common rod journalled on said carriage, said rod when turned altering the spacing of said edge guides while maintaining them centered on said vertex, said carriage being mounted for adjustment of its height relative to said planar path of the folded strip to present said aligned edges at the same height relative to said longitudinal seaming mechanism irrespective of the width of the folded strip entering the apparatus.

30. The method of producing individually pocketed springs in continuous strips, comprising the steps of:

advancing a two-ply longitudinally-folded strip of sheeting in regular motion longitudinally of the strip, inserting axially compressed springs between said plies in spaced succession with the ends of said springs engaged with said plies and with the spring axes perpendicular thereto, maintaining the compression of the springs of the springs between said plies through a predetermined length of travel of said plies to a release point, seaming the edges of said plies together before the release point is reached so as to form a sleeve about said compressed springs, making a transverse seam across said sleeve at a predetermined distance along said sleeve beyond said release point sufficient to allow a released spring to expand within said sleeve and against said plies to separate the plies, said sleeve being flattened to its full width by the formation of said transverse seam with said seamed ply edges incorporated into said transverse seam between the ends of said transverse seam, repeating the transverse seaming of said sleeve behind and alongside said expanded spring in spaced relation to said first-mentioned transverse seam to form a pocket enclosing the expanded spring therein with the seam of said edges positioned between the ends of the expanded spring, and defining a space within the sleeve for the expansion therein of the next spring to traverse said release point, and thereafter repeating said transverse seaming of said sleeve as aforesaid behind each successive spring released from compression by the advancing movement of said strip.

31. The method of claim 30 wherein the edges of the plies are seamed together during the advancing movement of the strip.

32. The method of claim 31 wherein said regular advancing movement is intermittent and the compressed springs are inserted between the plies while the strip is at rest.

33. The method of claims 30, 31, or 32 wherein the sheeting material includes thermoplastic content, and the seaming thereof is performed by thermal welding.

34. The method of claim 30 wherein said regular advancing motion is intermittent and the compressed springs are inserted between the plies while the strip is at rest.

35. The method of claims 30, 32, or 34 wherein the sheeting material includes thermoplastic content and the seaming thereof is performed by thermal welding.

36. The method of claim 30 wherein the folded strip and compressed springs contained therein between its plies advance to the release point in a planar path along which the edges of the plies are seamed together to form the sleeve, said sleeve being maintained in said planar path until the release point is reached, and the transverse seams as made are perpendicular to said planar path to provide said expansion space for a compressed spring within a tetrahedral configuration of said sleeve between each successive transverse seam and the release point of said planar path.

37. The method of claim 36 wherein the regular advancing motion of the strip is intermittent, the compressed springs are inserted while the strip is at rest.

38. The method of claim 37 wherein the sleeve-forming seam and the transverse seams are made during the advancing motion of the strip.

39. In a method of making pocketed springs in a connected series thereof, wherein said springs are compressed axially and inserted between the two plies of a longitudinally folded strip of sheeting which conveys said springs by regular longitudinal advancing movement of said strip along a confining planar path of predetermined length in which the compression of the springs is maintained, and the strip is made into a sleeve after the insertion of said springs by seaming the edges of said plies, the improvement which comprises:

flattening said sleeve by a transverse seam perpendicular to the plane of said path and spaced from the end of said path to provide an enclosed space between said plies into which a spring can expand, releasing each spring seriatim from compression at the end of said path for expansion into said enclosed space in the sleeve as the sleeve advances, and repeating said transverse seam behind and alongside each newly expanded spring to enclose said spring within a pocket in which the sleeve-forming seam is incorporated into each said transverse seam between the ends of the spring in said pocket.

40. The improved method of claim 39 wherein the advancing movement of the strip is intermittent, the seaming of the edges of said plies is effected during the advancing movement of said strip, and the sleeve between the end of said path and the previously made transverse seam takes the shape of a tetrahedron.

41. The method of claims 30, 36, or 39 in which the movement of the strip is intermittent, the seaming of the edges of said plies of the strip is continuous during the advancing movement of said strip, and the transverse seams between springs are made intermittently during the advancing movement of the strip.

42. The method of claims 30, 36, or 39 in which the movement of the strip is continuous, the seaming of the edges of said plies of the strip is continuous during the continuous movement of said strip, and the transverse seams between springs are made intermittently during the continuous movement of the strip.

43. The method of producing individually pocketed springs in continuous strips, comprising the steps of:

advancing a two-ply longitudinally-folded strip of sheeting in regular motion longitudinally of the strip, inserting axially compressed springs between said plies in spaced succession with the ends of said springs engaged with said plies and with the spring axes perpendicular thereto, maintaining the compression of the springs between said plies through a predetermined length of travel of said plies to a release point, seaming the edges of said plies together before the release point is reached so as to form a sleeve about said compressed springs, allowing the springs to expand within the sleeve as they successively pass said release point to separate said plies and position the edge seam of the sleeve between the ends of the springs and generally perpendicular to the axes of the springs, and making transverse seams between adjacent expanded springs and perpendicular to said edge seam to form pockets in the sleeve each containing an expanded spring.

44. In a method of making pocketed springs in a connected series thereof, wherein said springs are compressed axially and inserted between the two plies of a longitudinally folded strip of sheeting which conveys said springs by regular longitudinal advancing movement of said strip along a confining planar path of predetermined length in which the compression of the springs is maintained, and the strip is made into a sleeve after the insertion of said springs by seaming the edges of said plies, the improvement which comprises:

flattening said sleeve by a transverse seam perpendicular to the plane of said path and spaced from the end of said path to provide an enclosed space between said plies into which a spring can expand, releasing each spring seriatim from compression at the end of said path for expansion into said enclosed space in the sleeve as the sleeve advances, and making transverse seams between adjacent expanded springs and perpendicular to said sleeve-forming seam to form pockets in the sleeve each containing an expanded spring.

* * * * *

UNITED STATES PATENT AND TRADEMARK OFFICE
CERTIFICATE OF CORRECTION

PATENT NO. : 6,260,331 B1
DATED : July 17, 2001
INVENTOR(S) : Walter Stumpf

It is certified that error appears in the above-identified patent and that said Letters Patent is hereby corrected as shown below:

Title page,
Item [57], ABSTRACT, line 4, change "folder" to -- folded --.

Column 23,
Line 12, at the end of the line, delete the second instance of "of the springs".
Line 52, change "32" to -- 31 --.

Signed and Sealed this

Twelfth Day of March, 2002

Attest:

Attesting Officer

JAMES E. ROGAN
Director of the United States Patent and Trademark Office